(12) United States Patent
Kunii et al.

(10) Patent No.: US 8,269,927 B2
(45) Date of Patent: Sep. 18, 2012

(54) LIQUID CRYSTAL DISPLAY

(75) Inventors: Masafumi Kunii, Kanagawa (JP); Go Yamanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 12/435,493

(22) Filed: May 5, 2009

(65) Prior Publication Data

US 2009/0279029 A1    Nov. 12, 2009

(30) Foreign Application Priority Data

May 8, 2008    (JP) ................. 2008-122453

(51) Int. Cl.
*G02F 1/133* (2006.01)
*G02F 1/1343* (2006.01)

(52) U.S. Cl. ................ 349/116; 349/146

(58) Field of Classification Search ........... 349/116, 349/146
See application file for complete search history.

(56) References Cited

U.S. PATENT DOCUMENTS

| 7,088,409 | B2 | 8/2006 | Itou et al. | |
| 7,164,164 | B2 | 1/2007 | Nakamura et al. | |
| 8,045,104 | B2 * | 10/2011 | Cho et al. | 349/110 |
| 2007/0229749 | A1 | 10/2007 | Kaneko et al. | |
| 2008/0158138 | A1 * | 7/2008 | Yamazaki et al. | 345/102 |
| 2008/0297709 | A1 * | 12/2008 | Eguchi | 349/139 |

FOREIGN PATENT DOCUMENTS

| JP | 2005-275644 | 10/2005 |
| JP | 2005-338256 | 12/2005 |
| JP | 2006-003857 | 1/2006 |
| JP | 2007-264231 | 10/2007 |

* cited by examiner

*Primary Examiner* — Mark Robinson
*Assistant Examiner* — Charles Chang
(74) *Attorney, Agent, or Firm* — SNR Denton US LLP

(57) ABSTRACT

Disclosed herein is a liquid crystal display including a liquid crystal panel including, a first substrate, a second substrate opposed to said first substrate, and a liquid crystal layer interposed between said first substrate and said second substrate, a plurality of pixels being arrayed in a first direction and in a second direction orthogonal to said first direction in a pixel area provided in a plane where said first substrate and said second substrate are opposed.

9 Claims, 16 Drawing Sheets

FIG.7
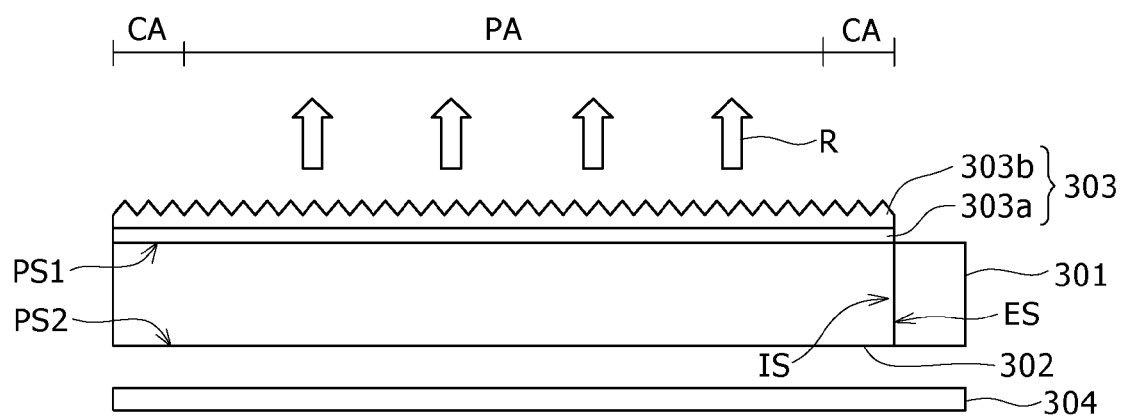
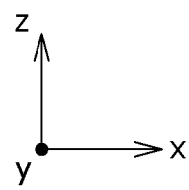

FIG.10
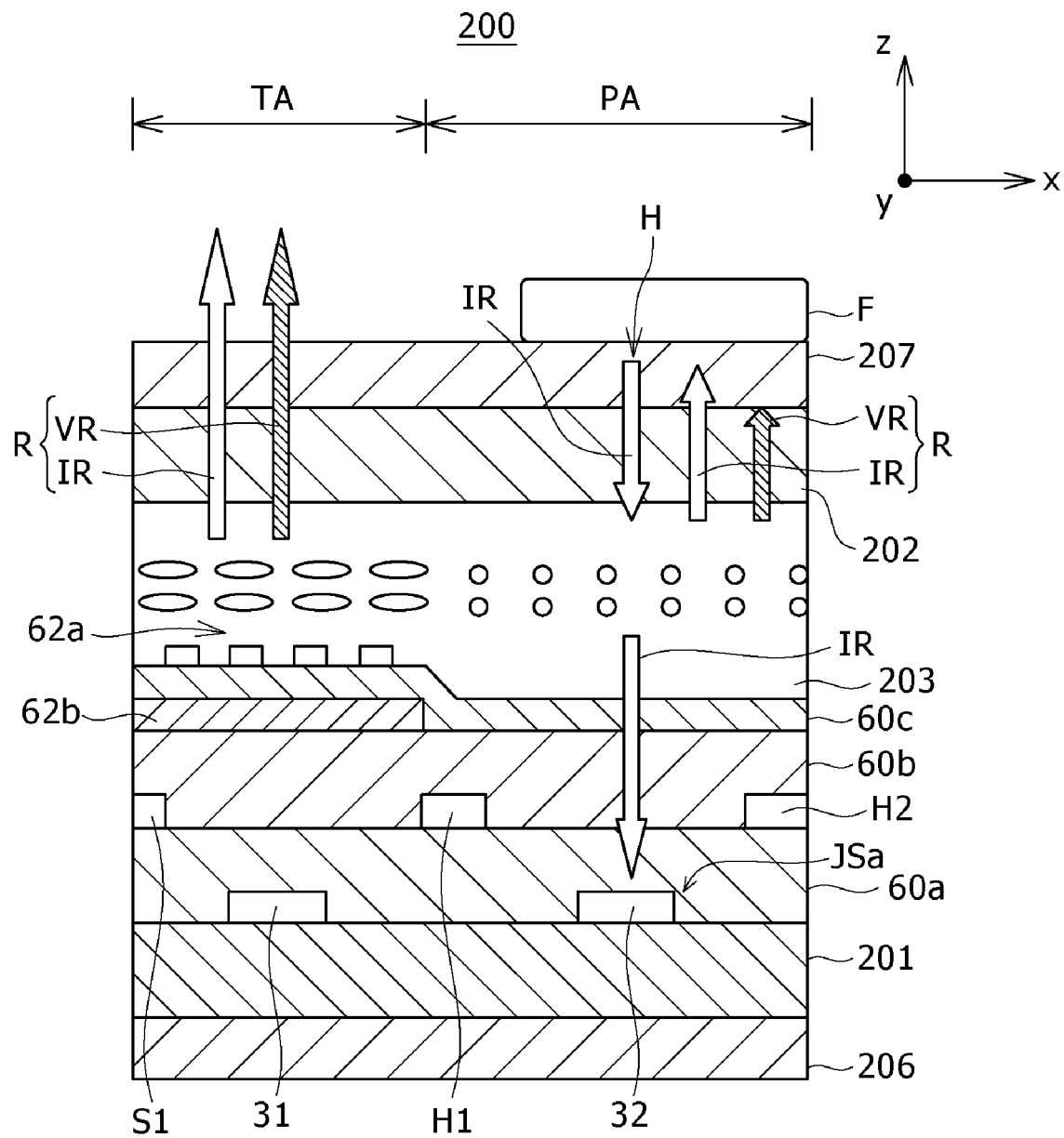
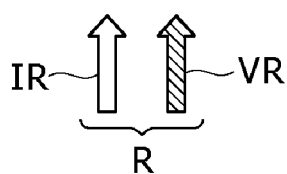
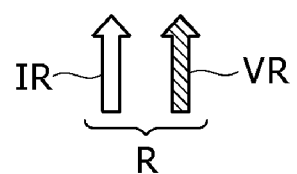

LIQUID CRYSTAL DISPLAY

BACKGROUND OF THE INVENTION

1. Field of the Invention

The present invention relates to a liquid crystal display. More particularly, the invention relates to a liquid crystal display in which photosensor elements operable to generate light reception data by receiving, at a light receiving surface, incident light which is incident thereon via a liquid crystal layer.

2. Description of the Related Art

Liquid crystal displays have, as a displaying panel, a liquid crystal panel in which a liquid crystal layer is sealed between a pair of substrates. A liquid crystal panel is of, for example, a transmission type in which illuminating light emitted from an illuminator such as a backlight provided at the back side of the liquid crystal panel is transmitted through the liquid crystal panel while being modulated. Then, by the illuminating light thus modulated, display of an image is performed on the front side of the liquid crystal panel.

The liquid crystal panel is, for example, of an active matrix system having a TFT array substrate on which thin film transistors (TFTs) operable to function as pixel switching elements are formed in a pixel area. Here, the thin film transistors are each formed by use of a polycrystalline silicon thin film, for example. In addition, a counter substrate is disposed to be opposed to the TFT array substrate, and a liquid crystal layer is provided between the TFT array substrate and the counter substrate.

In the active matrix type liquid crystal panel, the pixel switching element inputs a potential to a pixel electrode so that an electric field generated between the pixel electrode and a common electrode is impressed on the liquid crystal layer, whereby the orientation of liquid crystal molecules in the liquid crystal layer is changed. By this process, the transmittance for the light transmitted through the pixel is controlled, whereby the light being transmitted is modulated, and an image is displayed through such a modulation.

There has been proposed a liquid crystal panel of this type wherein photosensor elements operable to obtain light reception data by receiving light are incorporated in the pixel area in addition to semiconductor elements such as TFTs functioning as the pixel switching elements (see, for example, Japanese Patent Laid-open No. 2006-3857, hereinafter referred to as Patent Document 1). For instance, PIN (p-intrinsic-n) type photodiodes are integratedly provided as the photosensor elements. Here, the photosensor elements are each formed, for example, by use of a polycrystalline silicon film, like the pixel switching elements.

In the liquid crystal panel as above-mentioned, a user interface function can be realized by utilizing the photosensor elements incorporated therein as position sensor elements. In this type of liquid crystal panel, the need for an external touch panel of a resistor film system or a capacitance system to be separately provided at the front side of the liquid crystal panel is eliminated. As a result, it is possible to reduce the manufacturing cost of the apparatus using the liquid crystal panel and to easily realize reductions in size and thickness of the apparatus.

Further, in the case where a touch panel of the resistor film system or the capacitance system is installed, the quantity of light transmitted through the pixel area may be reduced or interfered by the touch panel, with the result of a lowering in the quality of the image displayed. This problem can be obviated by the above-mentioned configuration in which photosensor elements are incorporated in the liquid crystal panel as position sensor elements.

In this type of liquid crystal panel, for example, the illuminating light emitted from the backlight is transmitted through the liquid crystal panel, and is reflected by an object to be detected such as a user's finger or a stylus pen put into contact with the front surface of the liquid crystal panel, and the visible rays reflected by the object to be detected are received by the photosensor elements incorporated in the liquid crystal panel. Thereafter, based on light reception data obtained through the photosensor elements, the coordinate position where the object to be detected has touched the front surface of the liquid crystal panel is determined, and an operation corresponding to the thus determined position is carried out in the liquid crystal display itself or in an electronic apparatus including the liquid crystal display.

In the case where the coordinate position of the object to be detected is detected by use of the photosensor elements incorporated in the liquid crystal display as above-mentioned, the light reception data obtained through the photosensor elements may contain much noise due to the influence of visible rays contained in the ambient light. In addition, in the case of displaying a dark image such as in black displaying, the visible rays reflected by the object to be detected reaches the light receiving surface of the photosensor element with difficulty, so that it is difficult to receive the visible rays. Thus, there are cases where it is difficult to accurately detect the position of the object to be detected.

For an improvement as to such a trouble, a technique has been proposed in which invisible rays such as infrared rays are used in place of the visible rays (see, for example, Japanese Patent Laid-open No. 2005-275644, hereinafter referred to as Patent Document 2).

Here, the invisible rays such as infrared rays coming from the object to be detected are received by the photosensor elements, to obtain light reception data, and the position of the object to be detected is determined based on the data thus obtained. Especially, human fingers are high in surface reflectance at the infrared wavelengths, and, therefore, use of infrared light is preferable for detection of a human finger.

In this kind of liquid crystal panel, there have been known such liquid crystal displaying modes as the TN (Twisted Nematic) mode and the ECB (Electrically Controlled Birefringence) mode. In addition, liquid crystal displaying modes in which in-plane fields are impressed on a liquid crystal layer, such as the IPS (In-Plane Switching) system and the FFS (Fringe Field Switching) system, have also been known (refer to, for example, Patent Documents 1 and 2).

In each of the liquid crystal displaying modes, a variety of measures have been proposed for improving viewing angle characteristics.

For example, in the in-plane field modes, the pixel electrodes are each formed so as to include a part extending in a direction inclined relative to an x-direction and a y-direction in which the plurality of pixels are arranged in a matrix form. More specifically, a configuration has been proposed in which the pixel electrodes are formed in a shape resembling an angle bracket "<" so as to realize dual-domain pixels (refer to, for example, Japanese Patent Laid-open No. 2007-264231 and Japanese Patent Laid-open No. 2005-338256. With such a configuration, the asymmetry of viewing angle characteristics and gradation reversal which arise from the dielectric anisotropy of liquid crystal molecules are compensated for, and the viewing angle characteristics are thereby improved.

SUMMARY OF THE INVENTION

In the case where the pixel electrodes are formed in the above-mentioned manner, however, the photosensor elements incorporated in the liquid crystal panel as position sensor elements may have the problem that a sufficient light receiving surface area cannot be obtained and, hence, it is difficult to generate light reception data with high sensitivity.

Especially, in the case where the photosensor elements are formed by use of, for example, a polycrystalline silicon film in the same manner as the pixel switching elements, the just-mentioned problem may be conspicuously generated because the absorbance in absorption of infrared rays into the polycrystalline silicon thin film is low as compared with the absorbance for visible rays.

Thus, there is a need for a liquid crystal display in which the sensitivity of photosensor elements can be enhanced.

According to an embodiment of the present invention, there is provided a liquid crystal display including: a liquid crystal panel including a first substrate, a second substrate opposed to the first substrate, and a liquid crystal layer interposed between the first substrate and the second substrate, a plurality of pixels being arrayed in a first direction and in a second direction orthogonal to the first direction in a pixel area provided in a plane where the first substrate and the second substrate are opposed; wherein the first substrate includes a plurality of pixel electrodes provided so as to correspond respectively to the pixels, and photosensor elements each operable to generate light reception data by receiving, at a light receiving surface, incident light incident on the first substrate side from the second substrate side via the liquid crystal layer, the pixel electrodes and the photosensor elements being provided at a surface opposed to the second substrate in the pixel area; the pixel electrodes each include an inclined part extending in a direction inclined relative to the first direction and the second direction in the pixel area; and the photosensor elements are each formed with the light receiving surface in a shape along the direction in which the pixel electrodes extend.

Preferably, the pixel electrodes each have a trunk part extending in the first direction; and a plurality of the inclined parts of the pixel electrodes are provided to be spaced from one another in the first direction, the plurality of inclined parts being connected to the trunk part.

Preferably, the first substrate has a common electrode formed in the pixel area, and the pixel electrodes and the common electrode are configured to apply in-pane fields to the liquid crystal layer.

Preferably, the liquid crystal panel has a plurality of first wires provided to be spaced from one another in the first direction so as to demarcate a plurality of pixels arrayed in the first direction in the pixel area, and a plurality of second wires provided to be spaced from one another in the second direction so as to demarcate a plurality of pixels arrayed in the second direction in the pixel area; the first wires each have a wire inclined part extending in a direction which is different from the first and second directions and is inclined relative to the second direction in the pixel area; and the inclined part of the pixel electrode is formed along the direction in which the wire inclined part of the first wire extends.

Preferably, the inclined parts of the pixel electrodes are each formed so as to be symmetrical about an axis extending in the first direction.

Preferably, the liquid crystal display includes a position detecting section operable to detect the position of an object to be detected which is moved to a surface on the second substrate side of the liquid crystal panel, wherein a plurality of the photosensor elements are disposed in the pixel area, and the position detecting section detects the position of the object to be detected, based on light reception data generated by the plurality of photosensor elements.

Preferably, the liquid crystal display includes an illuminating unit operable to emit illuminating light to that surface of the liquid crystal panel which is on the first substrate side, wherein the liquid crystal panel is so configured that the illuminating light emitted by the illuminating unit is transmitted therethrough from its surface on the first substrate side to its surface on the second substrate side and that an image is displayed in the pixel area by the transmitted light, and the photosensor elements are each operable to receive, at the light receiving surface thereof, the reflected light generated upon reflection on the object to be detected of the illuminating light having been emitted by the illuminating unit and been transmitted through the liquid crystal panel.

Preferably, the illuminating unit is configured to emit visible rays and invisible rays as the illuminating light.

In the present invention, the pixel electrodes are each formed in the pixel area so as to include an inclined part extending in a direction which is inclined to the first and second directions. In addition, the light receiving surfaces of the photosensor elements are each formed in a shape along the direction in which the inclined parts of the pixel electrodes extend.

In accordance with the present invention, it is possible to provide a liquid crystal display in which the sensitivity of photosensor elements can be enhanced.

BRIEF DESCRIPTION OF THE DRAWINGS

FIG. 7 is a sectional view showing schematically a backlight in Embodiment 1 of the invention;

FIG. 10 illustrates schematically the manner of detecting the position of an object to be detected, based on light reception data obtained as to the object when a human finger as the object to be detected is brought into contact with or moved to the pixel area of the liquid crystal panel in Embodiment 1 of the invention;

DETAILED DESCRIPTION OF THE PREFERRED EMBODIMENTS

Now, exemplary embodiments of the present invention will be described below.
<Embodiment 1>
(Configuration of Liquid Crystal Display)

Figure 1:
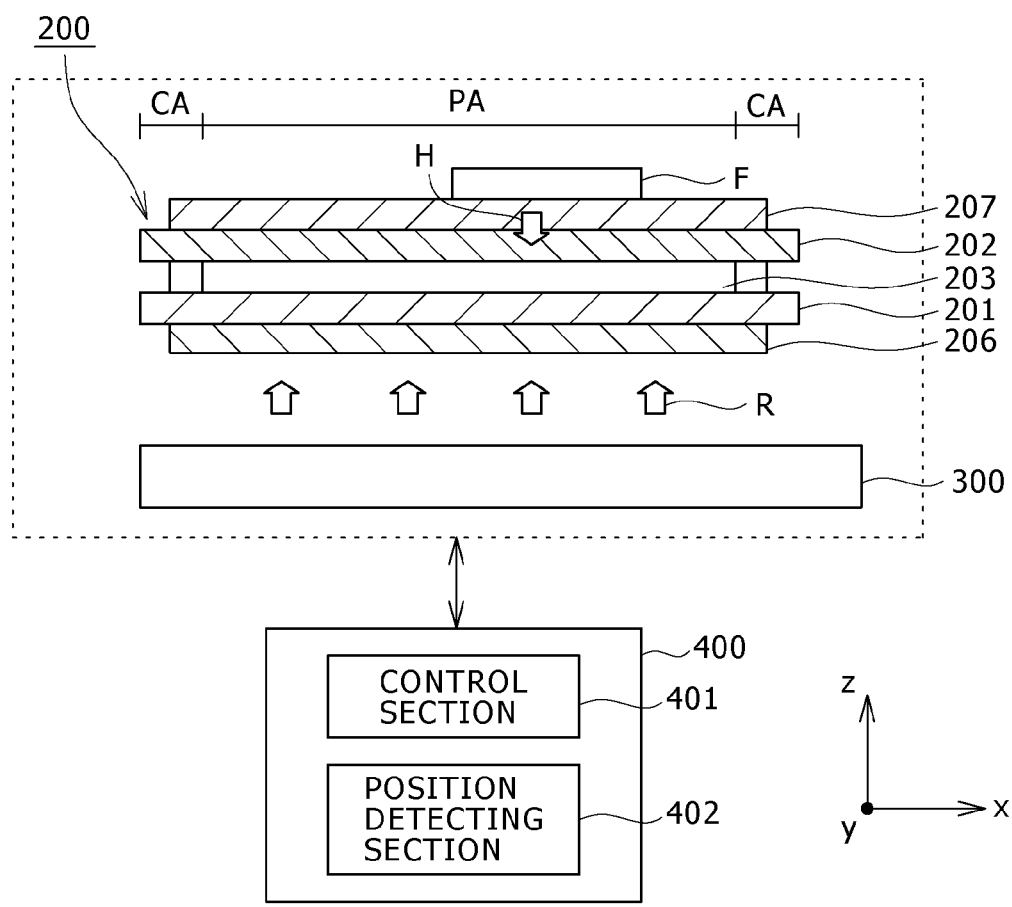
FIG. 1 is a sectional view showing the configuration of a liquid crystal display according to Embodiment 1 of the present invention.

FIG. 1 is a sectional view showing the configuration of a liquid crystal display 100 according to Embodiment 1 of the present invention.

As shown in FIG. 1, the liquid crystal display 100 in this embodiment includes a liquid crystal panel 200, a backlight 300, and a data processing unit 400. These components will be sequentially described below.

The liquid crystal panel 200 is of the active matrix system, and, as shown in FIG. 1, it includes a TFT array substrate 201, a counter substrate 202, and a liquid crystal layer 203.

In the liquid crystal panel 200, the TFT array substrate 201 and the counter substrate 202 are opposed to each other, with a spacing (gap) therebetween. In addition, the liquid crystal layer 203 is provided in the manner of being sandwiched between the TFT array 201 and the counter substrate 202.

In the liquid crystal panel 200, as shown in FIG. 1, the backlight 300 is disposed so as to be located on the side of the TFT array substrate 201. In the liquid crystal panel 200, that surface of the TFT array substrate 201 which is on the opposite side from the surface facing the counter substrate 202 is illuminated with illuminating light emitted from the backlight 300.

In addition, the liquid crystal panel 200 includes a pixel area PA in which a plurality of pixels (not shown) are arranged and in which an image is displayed. In the pixel area PA, the illuminating light R emitted by the backlight 300 disposed on the back side of the liquid crystal panel 200 is received from the back side via a first polarizing plate 206, and the illuminating light R received from the back side is modulated. Specifically, image displaying elements (not shown) are provided on the TFT array substrate 201 so as to correspond respectively to the plurality of pixels, and pixel switching elements (not shown) constituting the image displaying elements perform switching control of the pixels, thereby modulating the illuminating light received from the back side. The illuminating light R thus modulated is emitted to the front side through a second polarizing plate 207, whereby an image is displayed in the pixel area PA. In short, the liquid crystal panel 200 in this embodiment is of the transmission type, and, for example, a color image is displayed on the side of the front surface of the liquid crystal panel 200.

In the present embodiment, the liquid crystal display 100 is formed to be of the normally black system. Specifically, the components of the liquid crystal panel 200 are so configured that when no voltage is applied to the liquid crystal layer 203, the light transmittance in the pixel area PA is lowered, to display black. When a voltage is impressed on the liquid crystal layer 203, on the other hand, the light transmittance in the pixel area PA is raised, to display white.

Besides, though details will be described later, the liquid crystal panel 200 in this embodiment is provided with photosensor elements (not shown) operable to generate light reception data. The photosensor elements generate the light reception data by receiving reflected light H reflected by an object to be detected, F, such as a user's finger or a touch pen, when the object F comes into contact with or into proximity to the front surface, on the opposite side from the back side where the backlight 300 is disposed, of the liquid crystal panel 200.

For example, the photosensor elements are each formed to include a photodiode (not shown). The reflected light H reflected by the object to be detected, F, such as a finger on the front side of the liquid crystal panel 200 is received by the photodiode(s) at a light receiving surface(s) thereof. Thus, the illuminating light H which travels in the direction from the side of the counter substrate 202 toward the side of the TFT array substrate 201 is received. Upon receiving the illuminating light H, the photodiodes perform photoelectric conversion, to generate the light reception data.

As shown in FIG. 1, the backlight 300 faces the back surface of the liquid crystal panel 200, and emits the illuminating light R to the pixel area PA of the liquid crystal panel 200.

Here, the backlight 300 is disposed to be located on the side of the TFT array substrate 201, of the TFT array substrate 201 and the counter substrate 202 which constitute the liquid crystal panel 200. Besides, that surface of the TFT array substrate 201 which is on the opposite side from the surface facing the counter substrate 202 is illuminated with the illuminating light R. Thus, the backlight 300 emits the illuminating light R in the direction from the side of the TFT array substrate 201 toward the side of the counter substrate 202.

As shown in FIG. 1, the data processing unit 400 has a control section 401 and a position detecting section 402. The data processing unit 400 includes a computer, which controls operations of the components of the liquid crystal display 100 according to programs.

The control section 401 of the data processing unit 400 is configured to control the operations of the liquid crystal panel 200 and the backlight 300. The control section 401 supplies the liquid crystal panel 200 with a control signal, thereby controlling the operations of the plurality of pixel switching elements (not shown) provided in the liquid crystal panel 200. For example, the control section 401 effects line-sequential driving (line-sequential switching). In addition, based on a driving signal supplied externally, the control section 401 supplies the backlight 300 with a control signal, to control the operation of the backlight 300, in emission of the illuminating light R from the backlight 300. Thus, the control section 401 controls the operations of the liquid crystal panel 200 and the backlight 300, whereby an image is displayed in the pixel area PA of the liquid crystal panel 200.

In addition to the above, the control section 401 supplies the liquid crystal panel 200 with a control signal so as to control the operations of the plurality of photosensor elements (not shown) provided in the liquid crystal panel 200 as position sensor elements, thereby collecting light reception data from the photosensor elements. For example, the control section 401 effects line-sequential driving, to thereby collect the light reception data.

The position detecting section 402 in the data processing unit 400 detects the position where the object to be detected, such as a user's finger or a touch pen, has touched or approached the pixel area PA on the front side of the liquid crystal panel 200.

Here, the position detecting section 402 detects the position, based on the light reception data collected from the plurality of photosensor elements (not shown) provided in the liquid crystal panel 200. For example, a coordinate position at which the signal intensity of the light reception data is greater than a reference value is detected as a coordinate position at which the object to be detected, F, has touched the pixel area PA.

(Configuration of Liquid Crystal Panel)

Now, the total configuration of the liquid crystal panel 200 will be described below.

Figure 2:
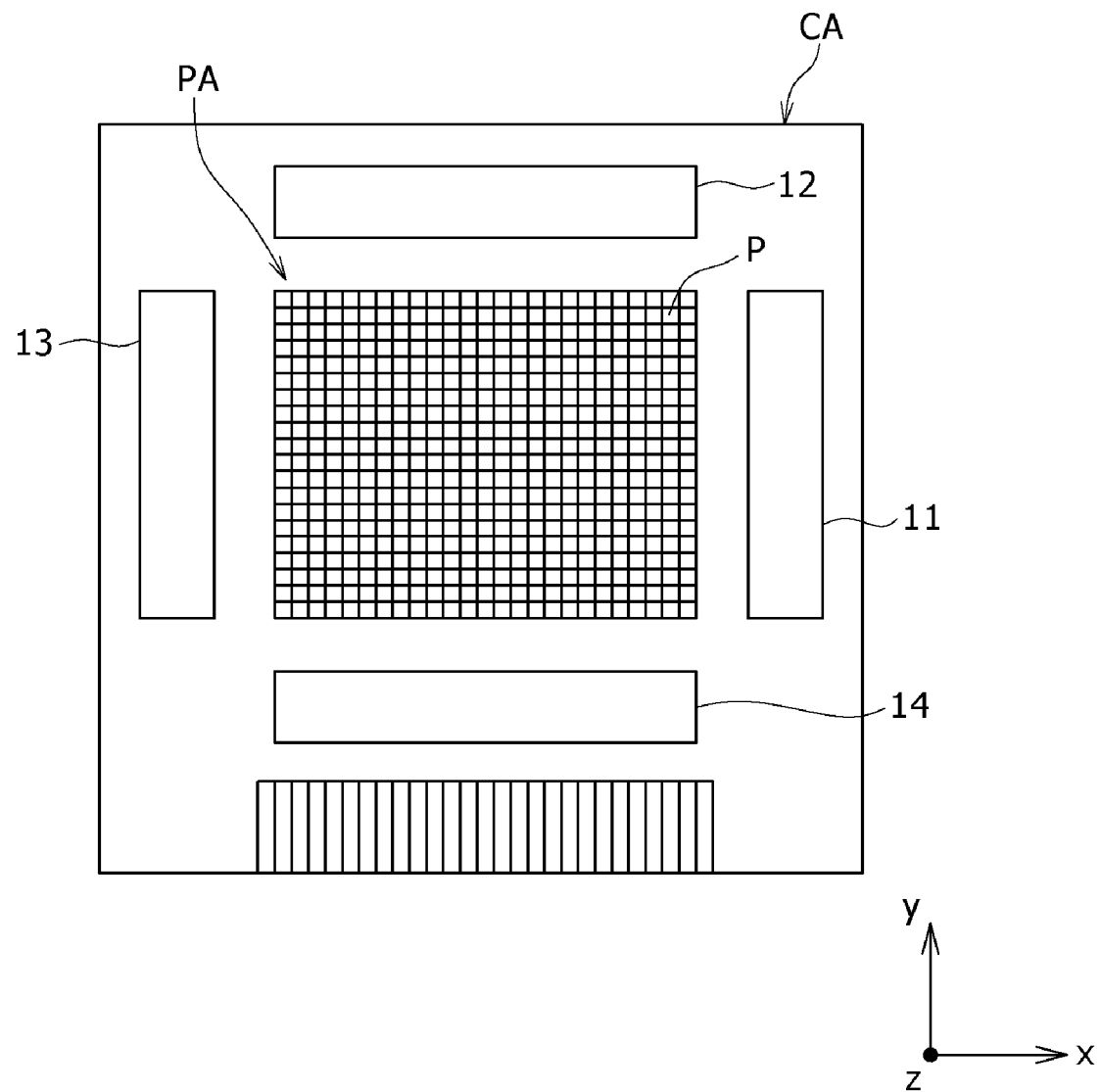
FIG. 2 is a plan view showing a liquid crystal panel in Embodiment 1 of the invention.

FIG. 2 is a plan view showing the liquid crystal panel 200 in Embodiment 1 of the present invention.

As shown in FIG. 2, the liquid crystal panel 200 has the pixel area PA and a circumferential area CA.

In the pixel area PA of the liquid crystal panel 200, a plurality of pixels P are arranged along the surface, as shown in FIG. 2. Specifically, in the pixel area PA, the plurality of pixels P are arranged in a matrix form, i.e., in the state of being arrayed in an x-direction and a y-direction orthogonal to the x-direction, and an image is displayed thereby. The pixels P are each provided with the pixel switching element and the photosensor element which have been mentioned above.

As shown in FIG. 2, the circumferential area CA in the liquid crystal panel 200 is located to surround the circumference of the pixel area PA. A display vertical driver circuit 11, a display horizontal driver circuit 12, a sensor vertical driver circuit 13, and a sensor horizontal driver circuit 14 are formed in the circumferential area CA, as shown in FIG. 2. Each of these circuits is configured, for example, by use of semiconductor devices which are formed in the same manner as the pixel switching elements and the photosensor elements mentioned above.

The pixel switching elements provided in the pixel area PA so as to correspond respectively to the pixels P are driven by the display vertical driver circuit 11 and the display horizontal driver circuit 12, to display an image. Concurrently with this, the photosensor elements provided in the pixel area PA so as to correspond respectively to the pixels P are driven by the sensor vertical driver circuit 13 and the sensor horizontal driver circuit 14, to collect light reception data.

(Configuration of Pixel Area of Liquid Crystal Panel)

Figure 3:
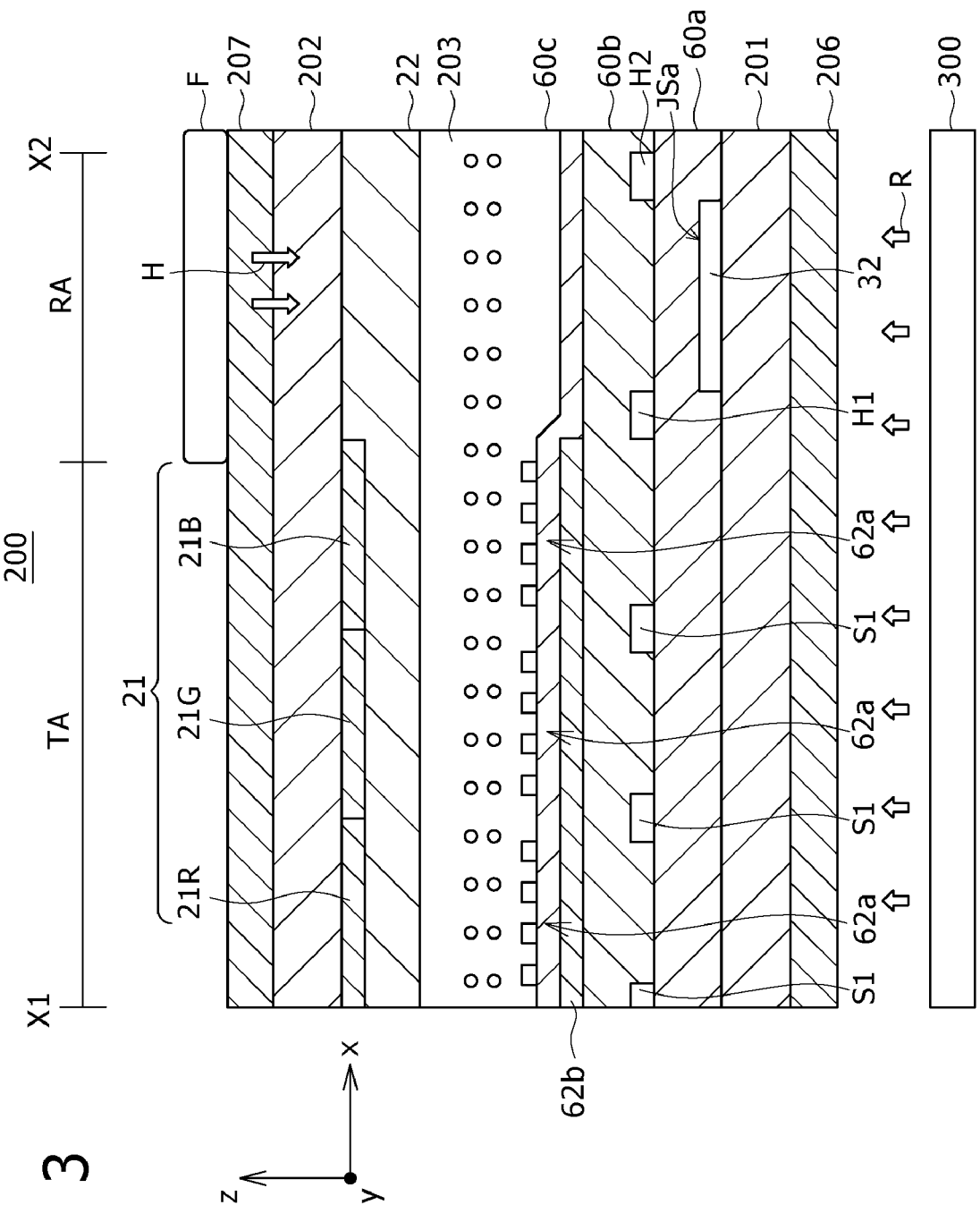
FIG. 3 is a sectional view showing schematically a major part of a pixel P provided in a pixel area of the liquid crystal panel in Embodiment 1 of the invention.

FIG. 3 is a sectional view showing schematically a major part of the pixel P provided in the pixel area PA of the liquid crystal panel 200 in Embodiment 1 of the present invention.

As shown in FIG. 3, the liquid crystal panel 200 includes the TFT array substrate 201, the counter substrate 202, and the liquid crystal layer 203. In this embodiment, the liquid crystal panel 200 is configured to correspond to a displaying mode of the FFS system, in which an image is displayed by applying in-plane electric fields to the liquid crystal layer 203. In addition, the liquid crystal panel 200 is configured to have dual-domain pixels.

In the liquid crystal panel 200, as shown in FIG. 3, the pixel P is demarcated into an effective display area TA and a sensor area RA in a plane where the TFT array substrate 201 and the counter substrate 202 are opposed to each other.

In the effective display area TA, as shown in FIG. 3, the illuminating light R emitted from the backlight 300 is transmitted along the direction from the side of the TFT array substrate 201 toward the side of the counter substrate 202, whereby an image is displayed.

On the other hand, in the sensor area RA, as shown in FIG. 3, reflected light H reflected by the object to be detected, F, on the front side of the liquid crystal panel 200 is received by the photosensor element 32, whereby light reception data is generated.

In the liquid crystal panel 200, the TFT array substrate 201 is a substrate formed of a light-transmitting insulator, for example, a glass. As shown in FIG. 3, the TFT array substrate 201 is provided with the photosensor elements 32, pixel electrodes 62*a*, a common electrode 62*b*, data lines S1, and sensor driving wires H1, H2 at its surface on the side of facing the counter substrate 202.

Besides, the counter substrate 202 in the liquid crystal panel 200, like the TFT array substrate 201, is a substrate formed of a light-transmitting insulator, for example, a glass. As shown in FIG. 3, the counter substrate 202 is opposed to the TFT array substrate 201, with a spacing therebetween. For example, the counter substrate 202 is opposed to the TFT array substrate 201, with the spacing secured by spacers (not shown) interposed therebetween, and the substrates are adhered to each other by use of a sealing material (not shown). In addition, as shown in FIG. 3, a color filter layer 21 is formed on that surface of the counter substrate 202 which is on the side of facing the TFT array substrate 201. Here, the color filter layer 21 includes a red filter layer 21R and a green filter layer 21G and a blue filter layer 21B, as a set for three primary colors of red, green and blue.

In the liquid crystal panel 200, as shown in FIG. 3, the liquid crystal layer 203 is sandwiched between the TFT array substrate 201 and the counter substrate 202.

Now, the TFT array substrate 201 constituting the liquid crystal panel 200 will be described in detail.

Figure 4:
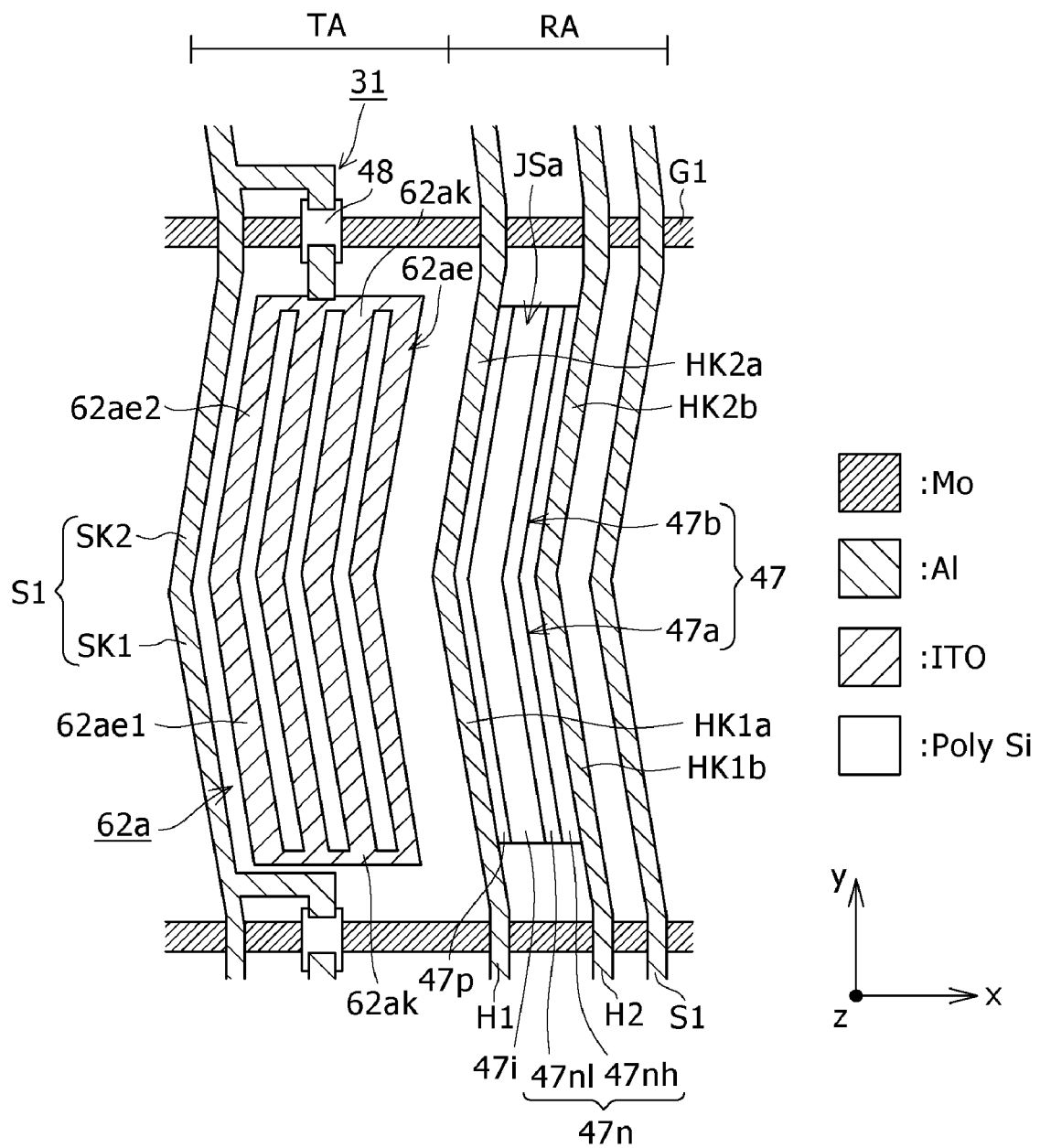
FIG. 4 is a plan view showing schematically a major part of a TFT array substrate in the pixel provided in the pixel area in Embodiment 1 of the invention.

FIG. 4 is a plan view showing schematically a major part of the TFT array substrate 201 in the pixel P provided in the pixel area PA in Embodiment 1 of the present invention.

In FIG. 4, the component members are hatched in different ways according to the materials thereof, as explained in the legend. Incidentally, while FIG. 4 shows the configuration of a sub-pixel corresponding to the red filter layer 21R in the pixel P shown in FIG. 3, each of the sub-pixels corresponding respectively to the green filter layer 21G and the blue filter layer 21B is also provided with the same component members as in the sub-pixel corresponding to the red filter layer 21R.

As shown in FIG. 4, a pixel switching element 31 and a gate line G1 are formed on the TFT array substrate 201, in addition to the component members shown in FIG. 3. The pixel switching element 31 and the gate line G1 are formed on that surface of the TFT array substrate 201 which is on the side of facing the counter substrate 202.

The component members provided on the TFT array substrate 201 will now be sequentially described.

In the TFT array substrate 201, as shown in FIG. 4, the pixel switching element 31 is formed in the effective display area TA of the liquid crystal panel 200. Though not shown in FIG. 3, the pixel switching element 31 is formed on that surface of the TFT array substrate 201 which is on the side of facing the counter substrate 202, like the photosensor element 32 shown in FIG. 3.

Here, the pixel switching element 31 is so provided as to correspond to each of the red filter layer 21R and the green filter layer 21G and the blue filter layer 21B which constitute the color filter layers 21 in the pixel P as shown in FIG. 3.

Figure 5:
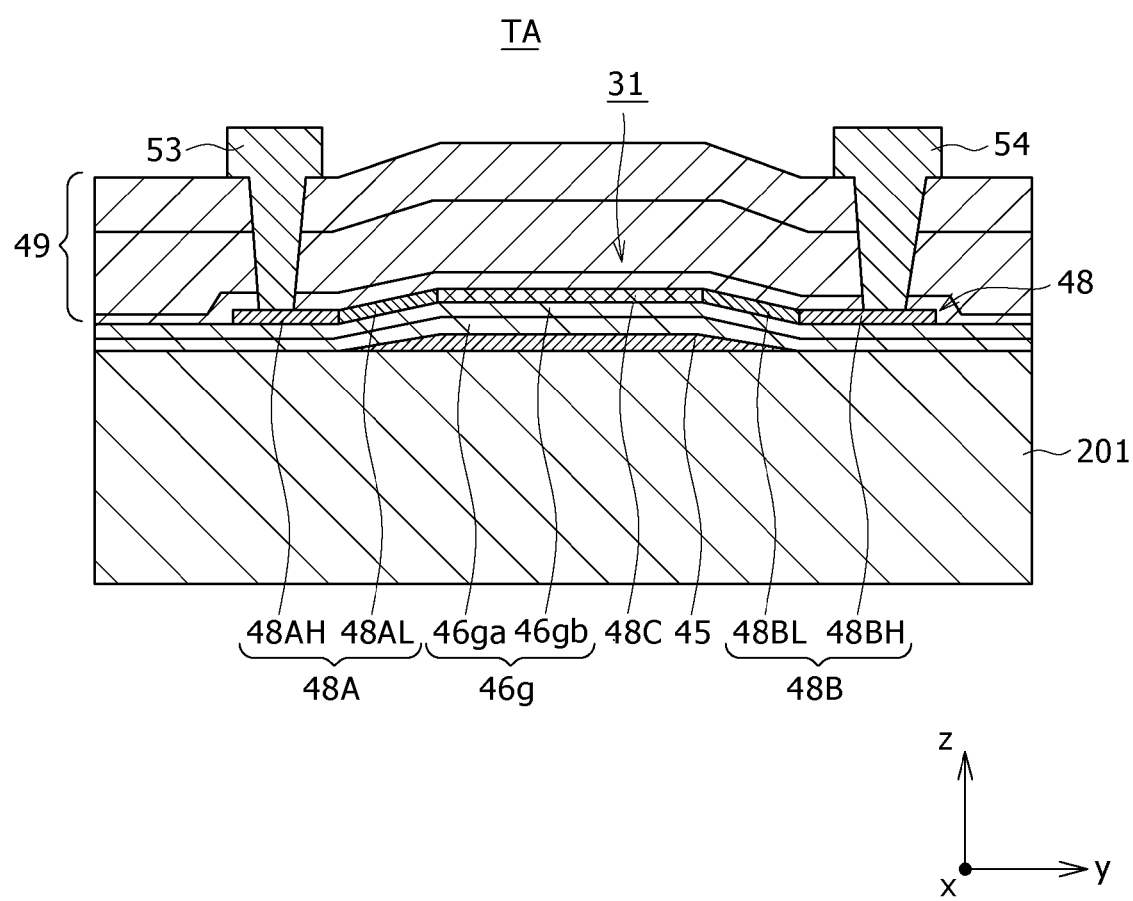
FIG. 5 is a sectional view showing a pixel switching element in Embodiment 1 of the invention.

FIG. 5 is a sectional view showing the pixel switching element 31 in Embodiment 1 of the present invention.

As shown in FIG. 5, the pixel switching element 31 is formed as a bottom gate TFT of the LDD (Lightly Doped Drain) structure, including a gate electrode 45, a gate insulator film 46g, and a semiconductor layer 48. For example, the pixel switching element 31 is formed as an N-channel TFT.

Specifically, in the pixel switching element 31, the gate electrode 45 is formed in a thickness of 60 to 90 nm by use of a metallic material such as molybdenum (Mo). Here, as shown in FIG. 5, the gate electrode 45 is provided on a surface of the TFT array substrate 201 so as to face a channel region 48C of the semiconductor layer 48, via the gate insulator film 46g therebetween.

Besides, in the pixel switching element 31, as shown in FIG. 5, the gate insulator film 46g is formed by stacking a silicon nitride film 46ga and a silicon oxide film 46gb so as to cover the gate electrode 45. Here, for example, the silicon nitride film 46ga is formed in a thickness of 40 nm, and the silicon oxide film 46gb is formed in a thickness of 50 nm.

In the pixel switching element 31, the semiconductor layer 48 is formed, for example, of polysilicon. For instance, a polysilicon thin film of 20 to 160 nm in thickness is formed as the semiconductor layer 48. As shown in FIG. 5, the semiconductor layer 48 is formed with the channel region 48C in the manner of corresponding to the gate electrode 45. In addition, a pair of source/drain regions 48A and 48B are so formed that the channel region 48C is located therebetween. The pair of source/drain regions 48A and 48B are provided with a pair of low-concentration impurity regions 48AL and 48BL so that the channel region 48C is located just therebetween. Further, a pair of high-concentration impurity regions 48AH and 48BH which are higher than the low-concentration impurity regions 48AL, 48BL in impurity concentration are formed on the laterally outer sides of the pair of low-concentration impurity regions 48AL, 48BL.

In the pixel switching element 31, a source electrode 53 and a drain electrode 54 are each formed by use of a conductive material such as aluminum. Here, as shown in FIG. 5, the source electrode 53 and the drain electrode 54 are formed by forming contact holes penetrating the inter-layer insulator film 49, and filling up the contact holes with the conductive material, followed by patterning. Specifically, the source electrode 53 is so provided as to be electrically connected to the source/drain region 48A on one side, and the drain electrode 54 is so provided as to be electrically connected to the source/drain region 48A on the other side.

In the TFT array substrate 201, as shown in FIG. 3, the photosensor element 32 is formed on that surface of the TFT array substrate 201 which faces the counter substrate 202.

Here, the photosensor element 32 is provided in the sensor area RA as shown in FIG. 3, and receives through the liquid crystal layer 203 the light coming along the direction from the side of the counter substrate 202 toward the side of the TFT array substrate 201 in the sensor area RA. Upon receiving the incident light, the photosensor element 32 performs photoelectric conversion to generate light reception data, and the light reception data is read.

In this embodiment, as shown in FIG. 3, the photosensor element 32 generates the light reception data upon receiving the reflected light H generated through a process in which the illuminating light R emitted from the backlight 300 is reflected by an object to be detected, F, along the direction from the front side toward the back side of the liquid crystal panel 200. For example, the photosensor element 32 receives at a light receiving surface JSa the reflected light H incident thereon via the liquid crystal layer 203, and generates the light reception data.

Figure 6:
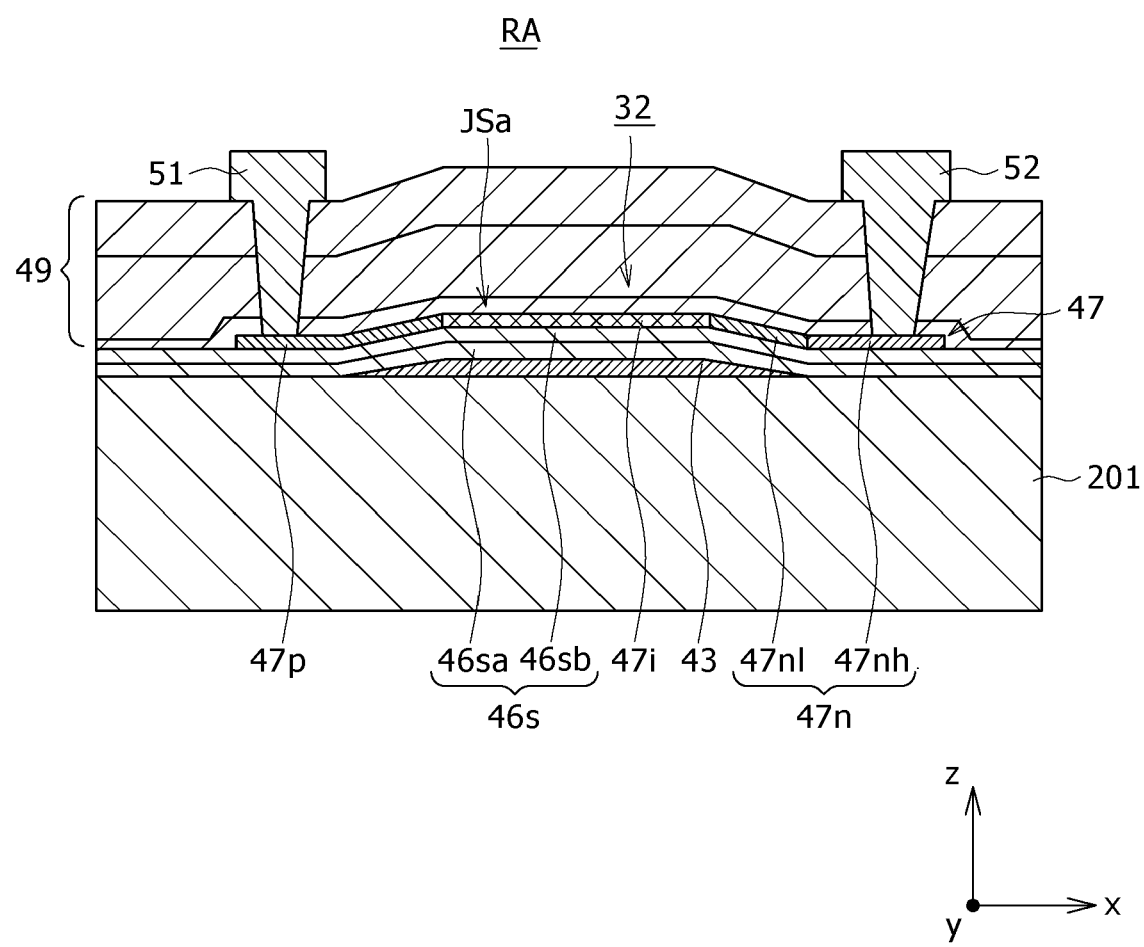
FIG. 6 is a sectional view showing a photosensor element in Embodiment 1 of the invention.

FIG. 6 is a sectional view showing the photosensor element 32 in Embodiment 1 of the present invention.

As shown in FIG. 6, the photosensor element 32 is a photodiode of the PIN structure, and includes a light shielding film 43, an insulator film 46s provided on the light shielding film 43, and a semiconductor layer 47 opposed to the light shielding film 43 via the insulator film 46s therebetween.

In the photosensor element 32, the light shielding film 43 is formed, for example, by use of a metallic material such as molybdenum, and intercepts light. Here, as shown in FIG. 6, the light shielding film 43 is provided on a surface of the TFT array substrate 201 so as to face an i-layer 47i of the semiconductor layer 47 via the insulator film 46s therebetween.

In addition, in the photosensor element 32, as shown in FIG. 6, the insulator film 46s is formed by stacking a silicon nitride film 46sa and a silicon oxide film 46sb so as to cover the light shielding film 43. Here, for example, the silicon nitride film 46sa is formed in a thickness of 40 nm, and the silicon oxide film 46sb is formed in a thickness of 50 nm.

Besides, in the photosensor element 32, the semiconductor layer 47 is formed, for example, of polysilicon. For instance, a polysilicon thin film of 20 to 160 nm in thickness is formed as the semiconductor layer 47. As shown in FIG. 6, the semiconductor layer 47 includes a p-layer 47p, an n-layer 47n, and the i-layer 47i. Here, the semiconductor layer 47 is so provided that the i-layer 47i having a high resistance is interposed between the p-layer 47p and the n-layer 47n. The p-layer 47P is doped with a p-type impurity, for example, boron. In addition, the i-layer 47i is a photoelectric conversion layer, has a light receiving surface JSa, receives light at the light receiving surface JSa, and performs photoelectric conversion. Besides, the n-layer 47n is doped with an n-type impurity such as phosphorus. Here, for reducing a leakage current, the n-layer 47n has a high-concentration region 47nh doped with an n-type impurity in a high concentration, and a low-concentration region 47nl doped with the n-type impurity in a concentration lower than that in the high-concentration region 47nh. The low-concentration region 47nl is formed intermediately between the high-concentration region 47nh and the i-layer 47i.

In this embodiment, as shown in FIG. 4, the semiconductor layer 47 is formed in a plan-view shape resembling an angle bracket "<" which is symmetrical about an axis extending in the x-direction, between adjacent ones of a plurality of gate lines G1 arrayed in the y-direction. Each of the p-layer 47p and the n-layer 47n and the i-layer 47i constituting the semiconductor layer 47 is also formed in a plan-view shape resembling an angle bracket "<" which is symmetrical about an axis extending in the x-direction. Here, the semiconductor layer 47 is formed along the direction in which a data line S1 and sensor driving wires H1, H2 extend.

Specifically, as shown in FIG. 4, the semiconductor layer 47 has a first semiconductor inclined part 47a and a second semiconductor inclined part 47b.

The first semiconductor inclined part 47a, between two gate lines G1 arrayed and spaced from each other in the y-direction, extends upward in the range from the side of the lower gate line G1 to a midpoint between the two gate lines G1 while being inclined at a predetermined angle to the left side in relation to the y-direction. For instance, the first semiconductor inclined part 47a is formed to be inclined at an angle of 10°, with the y-direction as a reference.

The second semiconductor inclined part 47b, between the two gate lines G1 arrayed and spaced from each other in the y-direction, extends downwards in the range from the side of the upper gate line G1 to a midpoint between the two gate lines G1 while being inclined at the same angle as above-mentioned to the left side in relation to the y-direction. For example, the second semiconductor inclined part 47b is formed to be inclined at an angle of 10°, with the y-direction as a reference.

In the photosensor element 32, each of an anode 51 and a cathode 52 is formed by use of aluminum, for example. Here, as shown in FIG. 6, an inter-layer insulator film 49 is provided so as to cover the semiconductor layer 47. The anode 51 is so formed as to be electrically connected to the p-layer 47p, by filling up a contact hole penetrating the inter-layer insulator film 49 with a conductive material, followed by patterning. Similarly, the cathode 52 is so formed as to be electrically connected to the n-layer 47n, by filling up a contact hole penetrating the inter-layer insulator film 49 with a conductive material, followed by patterning.

In the TFT array substrate 201, as shown in FIG. 3, the pixel electrodes 62a are formed on the side of that surface of the TFT array substrate 201 which faces the counter substrate 202.

Here, as shown in FIG. 3, the pixel electrodes 62a are provided on an insulator film 60c formed of an insulating material so as to cover a common electrode 62b on the TFT array substrate 201. For instance, the pixel electrodes 62a are provided on the insulating film 60c formed as a silicon nitride film. Besides, the pixel electrodes 62a are provided so as to correspond respectively to the red filter layer 21R and the green filter layer 21G and the blue filter layer 21B which constitute the color filter layer 21. The pixel electrodes 62a are so-called transparent electrodes formed, for example, by use of ITO, and are electrically connected to the drain electrodes 54 of the pixel switching elements 31. Each of the pixel electrodes 62a functions to generate an in-plane field between itself and the common electrode 62b, by a potential impressed thereon according to the supply of a data signal from the pixel switching element 31, and a voltage is thereby applied to the liquid crystal layer 203.

In this embodiment, the liquid crystal panel 200 is of the FFS system. Therefore, as shown in FIG. 4, the pixel electrode 62a is formed to be comb-like in shape in directions in the xy-surface, facing the counter substrate 202, of the TFT array substrate 201.

Specifically, as shown in FIG. 4, the pixel electrode 62a has trunk parts 62ak, and branch parts 62ae.

As shown in FIG. 4, the trunk parts 62ak of the pixel electrode 62a extend in the x-direction. Here, as shown in FIG. 4, the plurality of gate lines G1 each extending in the x-direction are arrayed and spaced from one another in the y-direction, and two trunk parts 62ak are provided between adjacent ones of the plurality of gate lines G1 arrayed in the y-direction. Between the two trunk parts 62ak, the branch parts 62ae are provided.

As shown in FIG. 4, the branch parts 62ae of the pixel electrode 62a are connected to the trunk parts 62ak, and extend in a direction which is different from the x-direction and the y-direction and which is inclined in relation to the x-direction and the y-direction. As shown in FIG. 4, a plurality of the branch parts 62ae are arrayed at intervals along the x-direction, and each of the plurality of branch parts 62ae is connected to the trunk parts 62ak at both ends thereof.

In this embodiment, as shown in FIG. 4, between adjacent ones of the plurality of gate lines G1 arrayed in the y-direction, the branch parts 62ae are each formed in a shape resembling an angle bracket "<" which is symmetrical about an axis extending in the x-direction. Here, the branch parts 62ae are formed along the direction in which the data line S1 extends.

Specifically, as shown in FIG. 4, the branch part 62ae has a first pixel electrode inclined part 62ae1, and a second pixel electrode inclined part 62ae2.

The first pixel electrode inclined part 62ae1, between the two gate lines G1 arrayed and spaced from each other in the y-direction, extends upward in the range from the lower gate line G1 to a midpoint between the two gate lines G1 while being inclined at a predetermined angle to the left side in relation to the y-direction. For instance, the first pixel electrode inclined part 62ae1 is formed to be inclined at an angle of 10°, with the y-direction as a reference.

The second pixel electrode inclined part 62ae2, between the two gate lines G1 arrayed and spaced from each other in the y-direction, extends downward in the range from the upper gate line G1 to a midpoint between the two gate lines G1 while being inclined at the same angle as above-mentioned to the left side in relation to the y-direction. For example, the second pixel electrode inclined part 62ae2 is formed to be inclined at an angle of 10°, with the y-direction as a reference.

In the TFT array substrate 201, as shown in FIG. 3, the common electrode 62b is formed on the side of that surface of the TFT array substrate 201 which is on the side of facing the counter substrate 202. Here, the common electrode 62b is provided on a flattening film 60b formed on the TFT array substrate 201 so as to cover the wires. For instance, the common electrode 62b is provided on the flattening film 60b formed from an organic compound such as an acrylic resin. The common electrode 62b is a so-called transparent electrode, and is formed by use of ITO, for example. The common electrode 62b faces the plurality of pixel electrodes 62a provided correspondingly to the plurality of pixels P, via the insulator film 60c therebetween.

In this embodiment, as shown in FIG. 3, the common electrode 62b is formed in solid pattern so as to cover the whole surface of the effective display area TA in directions in the xy-surface, facing the counter substrate 202, of the TFT array substrate 201.

In the TFT array substrate 201, as shown in FIG. 3, the data lines S1 are formed in the effective display area TA and on the side of that surface of the TFT array substrate 201 which faces the counter substrate 202. Here, the data lines Si are provided on an insulator film 60a formed on the TFT array substrate 201 so as to cover the semiconductor elements such as the photosensor elements 32. As shown in FIG. 3, a plurality of the data lines S1 are so provided as to correspond respectively to the red filter layer 21R and the green filter layer 21G and the blue filter layer 21B constituting the color filter layers 21, and are arrayed and spaced from one another in the x-direction. In other words, the plurality of data lines S1 are provided at intervals in the x-direction so as to demarcate a plurality of sub-pixels arrayed in the x-direction.

The data lines S1 are electrically connected to the display horizontal driver circuit 12, and are supplied with a data signal from the display horizontal driver circuit 12. In addition, the data lines S1 are electrically connected to source electrodes of the TFTs constituting the pixel switching elements 31, and supplies the data signal to the pixel electrodes 62a through the pixel switching elements 31.

In this embodiment, as shown in FIG. 4, the data lines S1 are formed by use of a metallic material such as aluminum, and are electrically connected to the source electrodes of the pixel switching elements 31. In addition, the data lines S1 extend in a direction which is different from the x-direction and the y-direction and which is inclined in relation to the x-direction and the y-direction.

Besides, as shown in FIG. 4, between adjacent ones of the plurality of gate lines G1 arrayed in the y-direction, the data lines S1 are each formed in a shape resembling an angle bracket "<" which is symmetrical about an axis extending in the x-direction. Here, the data lines S1 are formed along the direction in which the branch parts 62ae of the pixel electrodes 62a extend.

Specifically, as shown in FIG. 4, the data line S1 has a first data line inclined part SK1, and a second data line inclined part SK2.

The first data line inclined part SK1, between the two gate lines G1 arrayed and spaced from each other in the y-direction, extends upward in the range from the lower gate line G1 to a midpoint between the two gate lines G1 while being inclined at a predetermined angle to the left side in relation to the y-direction. For example, the first data line inclined part SK1 is formed to be inclined at an angle of 10°, with the y-direction as a reference.

The second data line inclined part SK2, between the two gate lines G1 arrayed and spaced from each other in the y-direction, extends downwards in the range from the upper gate line G1 to a midpoint between the two gate lines G1 while being inclined at the same angle as above-mentioned to the left side in relation to the y-direction. For instance, the second data line inclined part SK2 is formed to be inclined at an angle of 10°, with the y-direction as a reference.

In the TFT array substrate 201, as shown in FIG. 3, the sensor driving wires H1, H2 are formed on that surface of the TFT array substrate 201 which is on the side of facing the counter substrate 202, like the data lines S1. The sensor driving wires H1, H2 are each provided in the sensor area RA. Here, the sensor driving wires H1, H2 are each formed on the insulator film 60a formed on the TFT array substrate 201 so as to cover the semiconductor elements such as the photosensor element 32.

As shown in FIG. 4, the sensor driving wires H1, H2 are each formed by use of a metallic material such as aluminum, for example. Here, as shown in FIG. 4, the sensor driving wires H1, H2 are each electrically connected to the photosensor element 32. The sensor driving wire H1 on one side is electrically connected to an anode (not shown) of the photosensor element 32. Besides, the sensor driving wire H2 on the other side is electrically connected to a cathode (not shown) of the photosensor element 32.

In addition, the sensor driving wires H1, H2 each extend in a direction which is different from the x-direction and the y-direction and which is inclined relative to the x-direction and the y-direction, like the data lines S1. Here, as shown in FIG. 4, each of the sensor driving wires H1, H2 is formed in a shape resembling an angle bracket "<" which is symmetrical about an axis extending in the x-direction, between adjacent ones of the plurality of gate lines G1 arrayed in the y-direction. The sensor driving wires H1, H2 are each formed along the direction in which the branch parts 62ae of the pixel electrode 62a extend.

Specifically, as shown in FIG. 4, the sensor driving wires H1, H2 have first sensor driving wire inclined parts HK1a, HK1b and second sensor driving wire inclined parts HK2a, HK2b, respectively.

The first sensor driving wire inclined parts HK1a, HK1b, between the two gate lines G1 arrayed and spaced from each other in the y-direction, extend upward in the range from the lower gate line G1 to a midpoint between the two gate lines G1 while being inclined at a predetermined angle to the left side in relation to the y-direction. For instance, the first sensor driving wire inclined parts HK1a, HK1b are formed to be inclined at an angle of 10°, with the y-direction as a reference.

The second sensor driving wire inclined parts HK2a, HK2b, between the two gate lines G1 arrayed and spaced from each other in the y-direction, extend downward in the range from the upper gate line G1 to a midpoint between the two gate lines G1 while being inclined at the same angle as above-mentioned to the left side in relation to the y-direction. For example, the second sensor driving wire inclined parts HK2a, HK2b are formed to be inclined at an angle of 10°, with the y-direction as a reference.

In the TFT array substrate 201, as shown in FIG. 4, the gate lines G1 extend in the x-direction, and are formed by use of a metallic material such as molybdenum, for example. The gate lines G1 are provided at intervals in the y-direction so as to demarcate the plurality of pixels P arrayed in the y-direction in the pixel area PA. Here, the gate line G1 is electrically connected to the gate electrode 45 of the pixel switching element 31 shown in FIG. 5; in this embodiment, the gate line G1 is formed as one body with the pixel switching element 45. In addition, the gate line G1 is electrically connected to the display vertical driver circuit 11, and transfers a scan signal supplied from the display vertical driver circuit 11 to the gate electrode 45.

Now, the component parts provided on the counter substrate 202 constituting the liquid crystal panel 200 will be described.

In the counter substrate 202, as shown in FIG. 3, the color filter layer 21 is formed on that surface of the counter substrate 202 which faces the TFT array substrate 201, in the effective display area TA. The color filter layer 21 is formed as a set for three primary colors of red and green and blue, and includes the red filter layer 21R and the green filter layer 21G and the blue filter layer 21B. For instance, each of the filter layers 21R, 21G, 21B is formed by a method in which a coating liquid containing a colored pigment corresponding to the relevant color and a photoresist material is applied by a coating method such as spin coating to form a coating film, and the coating film is patterned by a lithographic technique. Here, for example, a polyimide resin is used as the photoresist material. Each of the red filter layer 21R and the green filter layer 21G and the blue filter layer 21B is so configured that the illuminating light R emitted from the backlight 300 is thereby colored and transmitted therethrough from the side of the TFT array substrate 201 toward the side of the counter substrate 202. Specifically, the red filter layer 21R colors the white illustrating light R in red, the green filter layer 21G colors the illuminating light R in green, and the blue filter layer 21B colors the illuminating light R in blue.

Though not shown in the drawings, each of the filter layers 21R, 21G, 21B is formed in a plan-view shape corresponding to the pixel electrode 62a. In this embodiment, each of the filter layers 21R, 21G, 21B is formed in a plan-view shape resembling an angle bracket "<" which is symmetrical about an axis extending in the x-direction, like the pixel electrode 62a.

Now, the liquid crystal layer 203 constituting the liquid crystal panel 200 will be described.

In the liquid crystal panel 200, as shown in FIG. 3, the liquid crystal layer 203 is sandwiched between the TFT array substrate 201 and the counter substrate 202. In addition, the liquid crystal layer 203 is aligned by liquid crystal alignment films (not shown) formed on those surfaces of the TFT array substrate 201 and the counter substrate 202 which face each other.

In this embodiment, the liquid crystal layer 203 has liquid crystal molecules aligned horizontally. Here, an aligning treatment is so conducted that the longitudinal directions of the liquid crystal molecules are aligned in the y-direction, in the xy-plane where the TFT array substrate 201 and the counter substrate 202 face each other.

(Configuration of Backlight)

Figure 8:
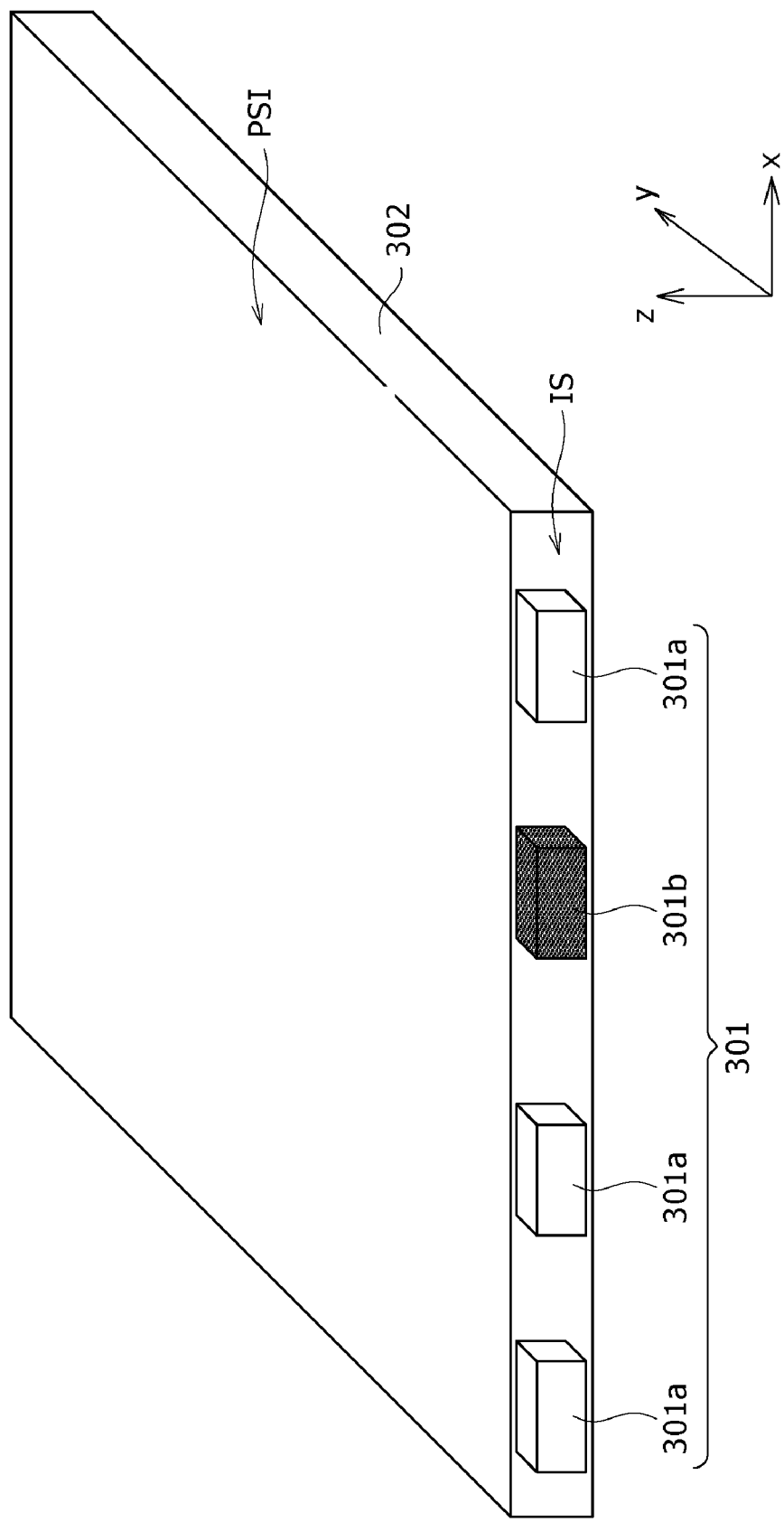
FIG. 8 is a perspective view showing schematically a major part of the backlight in Embodiment 1 of the invention.

FIG. 7 is a sectional view showing schematically the backlight 300 in Embodiment 1 of the present invention. FIG. 8 is a perspective view showing schematically a major part of the backlight 300 in Embodiment 1 of the present invention.

As shown in FIG. 7, the backlight 300 has a light source 301 and a light guide plate 302, and emits the illuminating light R so as to illuminate the whole surface of the pixel area PA of the liquid crystal panel 200.

As shown in FIG. 7, the light source 301 includes an emitting surface ES for emitting the light, and is so disposed that the emitting surface ES faces an incidence surface IS of the light guide plate 302 on which the light is incident. Here, the emitting surface ES of the light source 301 faces the incidence surface IS provided at a side face of the light guide plate 302. The light source 301 is supplied with a control signal from the control section 401, and carries out a light emitting operation based on the control signal.

In this embodiment, as shown in FIG. 8, the light source 301 has visible light sources 301a and an infrared light source 301b.

The visible light sources 301a are, for example, white LEDs, which emit visible rays. As shown in FIG. 8, the visible light sources 301a are so disposed that their emitting surfaces ES face the incidence surface IS of the light guide plate 302, and the visible rays are emitted from their emitting surfaces ES to the incidence surface IS of the light guide plate 302. Here, the visible light sources 301a are provided in plurality, and the plurality of visible light sources 301a are arranged to be arrayed along the incidence surface IS of the light guide plate 302.

The infrared light source 301b is, for example, an infrared LED, which emits infrared rays. As shown in FIG. 8, the infrared light source 301b is so disposed that its emitting surface ES faces the incidence surface IS of the light guide plate 302, and the infrared rays are emitted from its emitting surface ES to the incidence surface IS of the light guide plate 302. For example, infrared rays with a center wavelength of 850 nm are emitted. Here, for example, a single infrared light source 301b is provided on the incidence surface IS of the light guide plate 302 on which the visible light sources 301a are provided, so as to be arrayed with the visible light sources 301a. In this embodiment, as shown in FIG. 8, the infrared light source 301b is disposed in a roughly central area of the incidence surface IS of the light guide plate 302 on which the visible light sources 301a are provided.

As shown in FIG. 7, the light guide plate 302 is so provided that the emitting surfaces ES of the light sources 301 face its incidence surface IS, and the rays emitted from the emitting surfaces ES are incident thereon. The light guide plate 302 guides the rays incident on its incidence surface IS. The light guide plate 302 functions so that the rays guided thereby are emitted as the illuminating light R from an outgoing surface PS1 provided to be orthogonal to the incidence surface IS. The light guide plate 302 is disposed so as to face the back surface of the liquid crystal panel 200, and emits the illuminating light R from its outgoing surface PS1 toward the back surface of the liquid crystal panel 200. The light guide plate 302 is formed, for example, from a highly light-transmitting transparent material such as an acrylic resin by injection molding.

In this embodiment, both the visible rays emitted from the visible light source 301a and the infrared rays emitted from the infrared light source 301b are incident on the incidence surface IS of the light guide plate 302, and the visible rays and the infrared rays incident on the incidence surface IS are guided by the light guide plate 302. The visible rays and the infrared rays thus guided are emitted from the outgoing surface PS1 as the illuminating light R. Then, an image is displayed in the pixel area PA of the transmission-type liquid crystal panel 200, as above-mentioned.

As shown in FIG. 7, the light guide plate 302 is provided with an optical film 303 and a reflective film 304.

The optical film 303 is so provided as to face the outgoing surface PS1 of the light guide plate 302, as shown in FIG. 7. The optical film 303 is so configured as to receive the illuminating light R emitted from the outgoing surface PS1 of the light guide plate 302, and to modulate the optical characteristics of the illuminating light R.

In this embodiment, the optical film 303 has a diffuser sheet 303a and a prism sheet 303b, which are arranged in this order from the side of the light guide plate 302. The diffuser sheet 303a diffuses the light emitted from the outgoing surface PS1 of the light guide plate 302, whereas the prism sheet 303b condenses the thus diffused light along the normal direction z with respect to the outgoing surface PS1 of the light guide plate 302. In this way, the optical film 303 functions so that the light emitted from the light guide plate 302 is emitted toward the back surface of the liquid crystal panel 200 as the illuminating light R in the form of plane light.

As shown in FIG. 7, the reflective film 304 is so provided as to face the surface, located on the opposite side from the outgoing surface PS1, of the light guide plate 302. The reflective film 304 receives the light emitted from the surface PS2, located on the opposite side from the outgoing surface PS1, of the light guide plate 302 and reflects the light toward the side of the outgoing surface PS1 of the light guide plate 302.

(Operation)

In the liquid crystal display 100 as above, when a human finger as an object to be detected, F, is brought into contact with or moved to the pixel area PA of the liquid crystal panel 200, the position of the object F is detected based on light reception data obtained from the object F. The operation at the time of this detection will now be described.

Figure 9:
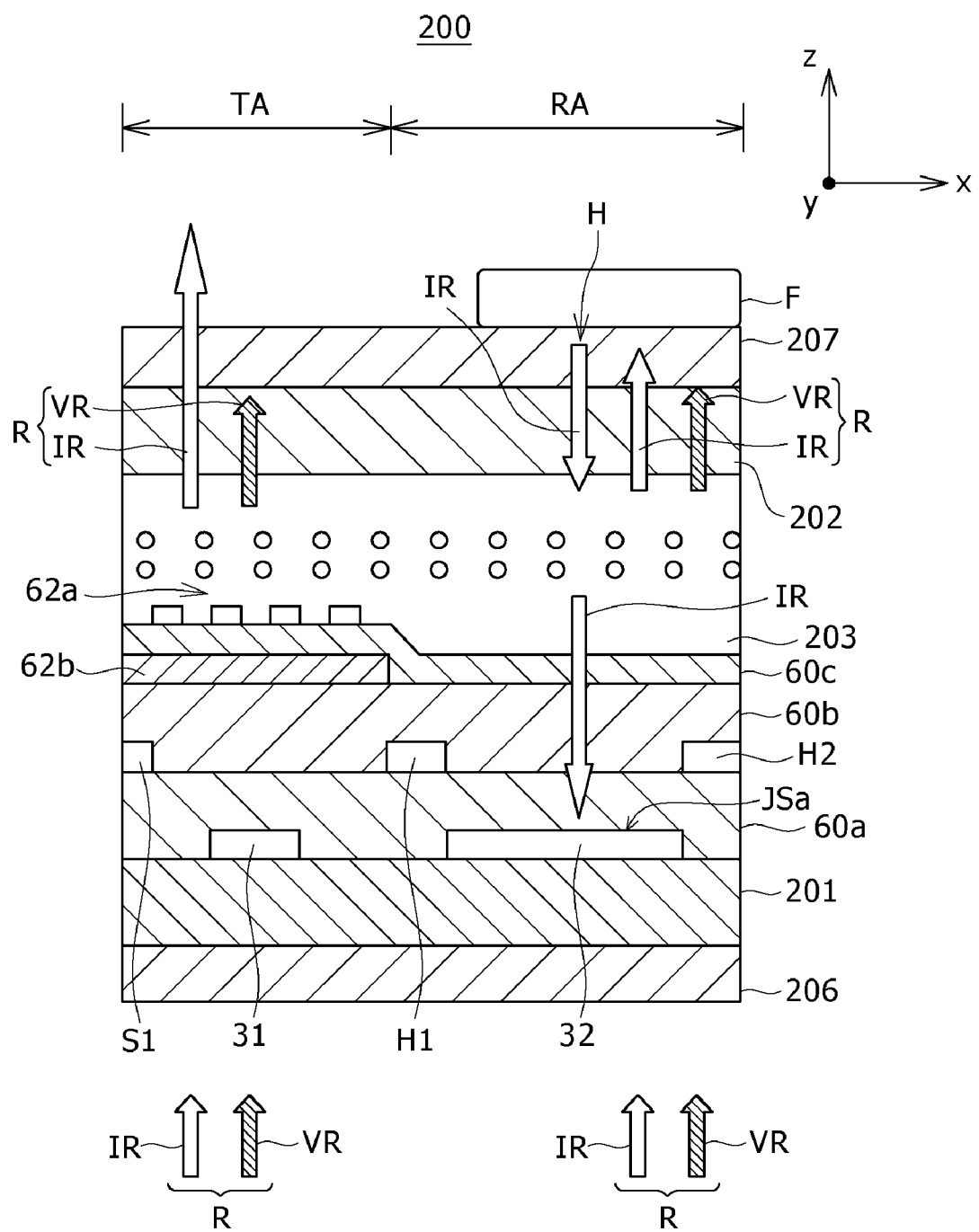
FIG. 9 illustrates schematically the manner of detecting the position of an object to be detected, based on light reception data obtained as to the object when a human finger as the object to be detected is brought into contact with or moved to the pixel area of the liquid crystal panel in Embodiment 1 of the invention.

FIGS. 9 and 10 illustrate schematically the manner of detecting the position of an object to be detected, F, based on light reception data obtained from the object F when a human finger as the object F is brought into contact with or moved to the pixel area PA of the liquid crystal panel 200 in Embodiment 1 of the present invention. Here, FIG. 9 illustrates the case where no voltage is impressed on the liquid crystal layer 203 (OFF condition), whereas FIG. 10 illustrates the case where a voltage is impressed on the liquid crystal layer 203 (ON condition). In FIGS. 9 and 10, only major parts are depicted, and the other parts are omitted.

The case where no voltage is impressed on the liquid crystal layer 203 (OFF condition) will now be described.

In this case, as shown in FIG. 9, in the effective display area TA of the liquid crystal panel 200, the longitudinal directions of the liquid crystal molecules aligned horizontally in the liquid crystal layer 203 are aligned along the y-direction, for example. In this embodiment, the component parts are so configured that the display system is the normally black system. Therefore, in the effective display area TA of the liquid crystal panel 200, the visible rays VR in the illuminating light R emitted from the backlight 300 are not transmitted through the second polarizing plate 207 but absorbed, resulting in black display.

On the other hand, the infrared rays IR in the illuminating light R emitted from the backlight 300 are transmitted through the second polarizing plate 207.

In contrast, in the sensor area RA of the liquid crystal panel 200, as shown in FIG. 9, the longitudinal directions of the liquid crystal molecules aligned horizontally in the liquid crystal layer 203 are aligned along, for example, the y-direction, in the same manner as in the effective display area TA. Therefore, the visible rays VR in the illuminating light R emitted from the backlight 300 are not transmitted through the liquid crystal panel 200.

On the other hand, the infrared rays IR in the illuminating light R emitted from the backlight 300 are transmitted through the second polarizing plate 207 in the sensor area RA. Accordingly, when an object to be detected, F, such as a human finger is brought into contact with or moved to the pixel area PA, the transmitted infrared rays IR are reflected by the object F, as shown in FIG. 9. The members such as the insulator film 60*a* existing in the optical path of the illuminating light R are low, substantially zero, in absorbance for the infrared rays IR, so that the reflected light H contains the infrared rays IR in a high proportion. Therefore, the reflected light H containing the infrared rays IR in a high proportion is received by the photosensor element 32 provided in the liquid crystal panel 200.

Here, the reflected light H traveling toward a light receiving surface JSa is received by the photosensor element 32 at the light receiving surface JSa, and undergoes photoelectric conversion by the photosensor element 32. Then, light reception data based on an electric charge generated by the photoelectric conversion is read by a peripheral circuit.

Then, as above-mentioned, by use of the light reception data thus read, the position detecting section 402 obtains an image of the object to be detected, F, located in the pixel area PA on the front side of the liquid crystal panel 200, and detects the position of the object F on the basis of its image thus obtained.

Now, description will be made of the case where a voltage is impressed on the liquid crystal layer 203 (ON condition).

In this case, as shown in FIG. 10, in the effective display area TA of the liquid crystal panel 200, the longitudinal directions of the liquid crystal molecules aligned horizontally in the liquid crystal layer 203 are inclined in a direction different from the y-direction. Therefore, in the effective display area TA of the liquid crystal panel 200, the visible rays VR in the illuminating light R emitted from the backlight 300 are transmitted through the second polarizing plate 207, resulting in white display. In addition, the infrared rays IR in the illuminating light R emitted from the backlight 300 are also transmitted through the second polarizing plate 207.

In contrast, in the sensor area RA of the liquid crystal panel 200, neither the pixel electrodes 62*a* nor the common electrode 62*b* is formed, so that no voltage is impressed on the liquid crystal layer 203. Therefore, the longitudinal directions of the liquid crystal molecules aligned horizontally in the liquid crystal layer 203 are aligned, for example, in the y-direction, in the same manner as in the case where no voltage is impressed on the liquid crystal layer 203 (OFF condition). Consequently, the visible rays VR in the illuminating light R emitted from the backlight 300 are not transmitted through the liquid crystal panel 200.

On the other hand, the infrared rays IR in the illuminating light R emitted from the backlight 300 are transmitted through the second polarizing plate 207 in the sensor area RA, as shown in FIG. 10, in the same manner as above. Therefore, when an object to be detected, F, such as a human finger is brought into contact with or moved to the pixel area PA, the transmitted infrared rays IR are reflected by the object F, as shown in FIG. 10, and the reflected light H is received by the photosensor element 32 provided in the liquid crystal panel 200. Then, the reflected light H traveling toward the light receiving surface JSa is received by the photosensor element 32 at the light receiving surface JSa, and the light reception data generated by photoelectric conversion of the received light is read by the peripheral circuit.

Then, as above-mentioned, by use of the light reception data thus read from the photosensor element 32, the position detecting section 402 obtains an image of the object to be detected, F, located in the pixel area PA on the front side of the liquid crystal panel 200, and detects the position of the object F on the basis of its image thus obtained.

In this embodiment, as above-mentioned, each of the branch parts 62*ae* of the pixel electrode 62*a* has the first pixel electrode inclined part 62*ae*1 and the second pixel electrode inclined part 62*ae*2, which extend in a direction inclined in relation to the x-direction and the y-direction in which the plurality of pixels P are arranged in the pixel area PA. In addition, the semiconductor layer 47 of the photosensor element 32 has the first semiconductor inclined part 47*a* and the second semiconductor inclined part 47*b*, which, like the branch parts 62*ae*, extend in a direction inclined in relation to the x-direction and the y-direction in which the plurality of pixels P are arranged in the pixel area PA. In other words, the photosensor element 32 has the light receiving surface JSa formed in a shape along the direction in which the first pixel electrode inclined parts 62*ae*1 and the second pixel electrode inclined parts 62*ae*2 of the pixel electrode 62*a* extend. Thus, in this embodiment, the light receiving surface JSa of the photosensor element 32 is formed along the edge of the outer shape of the pixel electrode 62*a* that is inclined in relation to the x-direction and the y-direction in which the plurality of pixels P are arranged. This makes it possible for the area of the light receiving surface JSa to be set large. Therefore, in this embodiment, the light reception sensitivity of the photosensor elements 32 can be enhanced. Accordingly, in this embodiment, it is possible to realize both displaying of an image with a wide viewing angle and enhancement of the sensitivity of the photosensor elements.

Besides, in this embodiment, the backlight 300 emits the illuminating light R such as to contain infrared rays IR in addition to visible rays VR. Therefore, even in a dark environment or when a low-brightness image is being displayed, the position of an object to be detected, F, such as a finger can be detected with a high S/N by detecting the reflected light H which arises from the reflection of the infrared rays IR on the object F. Consequently, it is possible to realize a touch panel incorporating type display in which the probability of misdetection is low even when a low-brightness image such as a night view is the background, in which the degree of freedom in designing a graphical user interface is increased, and which is high in reliability.

<Embodiment 2>

Now, Embodiment 2 of the present invention will be described below.

Figure 11:
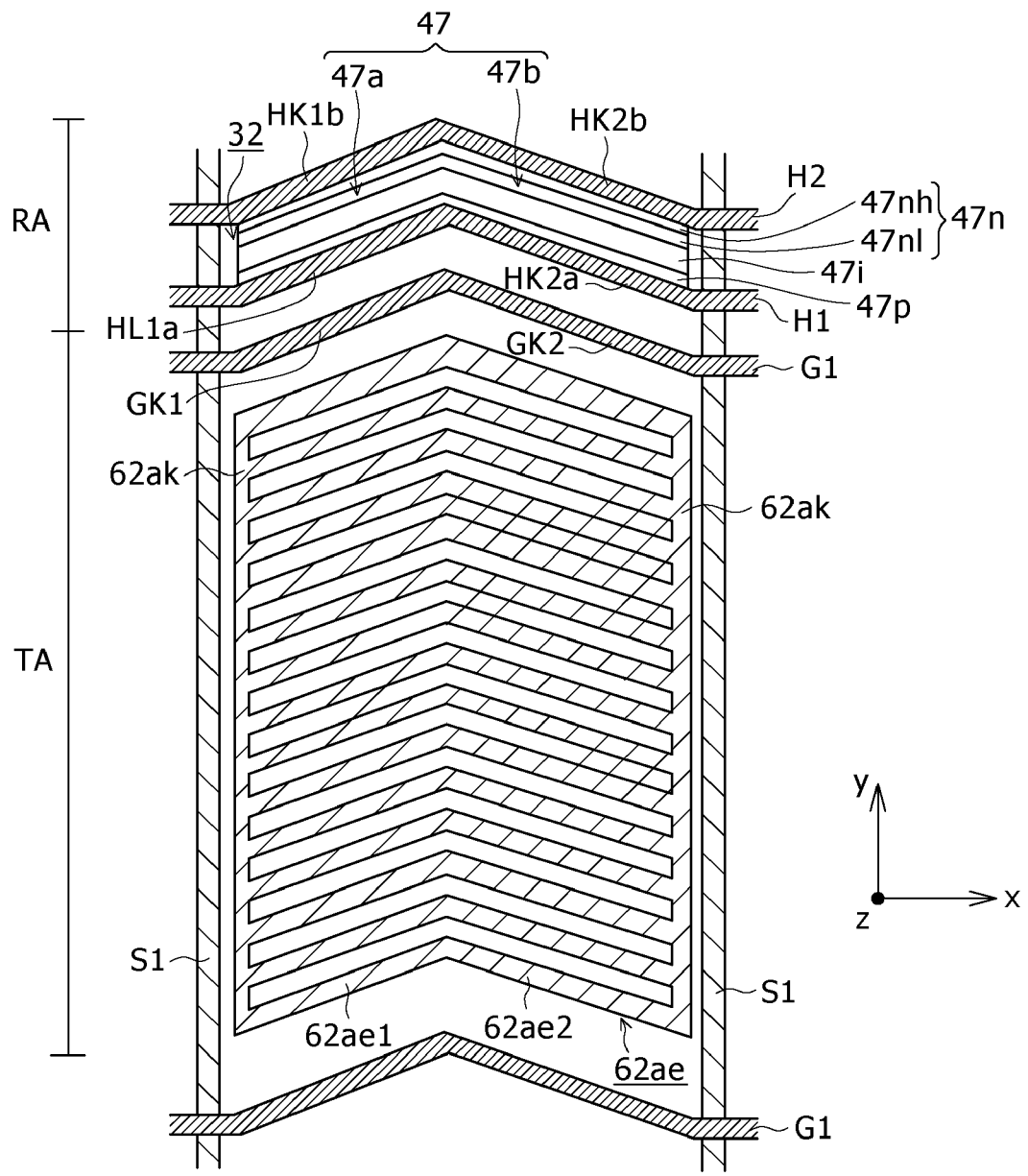
FIG. 11 is a plan view showing schematically a major part of a TFT array substrate in a pixel provided in a pixel area in Embodiment 2 of the invention.

FIG. 11 is a plan view showing schematically a major part of a TFT array substrate 201 in a pixel P provided in a pixel area PA in Embodiment 2 of the present invention. While only one of three sub-pixels constituting one pixel P is shown in FIG. 11, the other sub-pixels also have members configured in the same manner as in the sub-pixel shown.

As shown in FIG. 11, this embodiment is the same as Embodiment 1, except for differences in the shapes of the parts constituting the pixel P. Therefore, descriptions of the same items as those in Embodiment 1 will be omitted. For instance, in FIG. 11, the pixel switching element is omitted.

The parts in this embodiment will be sequentially described.

As shown in FIG. 11, a photosensor element 32 is provided in a sensor area RA.

In the photosensor element 32, as shown in FIG. 11, a semiconductor layer 47 has a plan-view shape resembling an angle bracket "<" which is symmetrical about an axis extending in the y-direction, between adjacent ones of a plurality of data lines S1 arrayed in the x-direction. Each of a p-layer 47p and an n-layer 47n and an i-layer 47i which constitute the semiconductor layer 47, also, has a plan-view shape resembling an angle bracket "<" which is symmetrical about an axis extending in the y-direction. Here, the semiconductor layer 47 is formed along the direction in which a gate line G1 and sensor driving wires H1, H2 extend.

Specifically, as shown in FIG. 11, the semiconductor layer 47 has a first semiconductor inclined part 47a and a second semiconductor inclined part 47b, like in Embodiment 1.

Unlike in Embodiment 1, the first semiconductor inclined part 47a, between the two data lines S1 arrayed and spaced from each other in the x-direction, extends rightward in the range from the left-side data line S1 to a midpoint between the two data lines S1 while being inclined at a predetermined angle to the upper side. For instance, it is formed to be inclined at an angle of 10° to the upper side, with the x-direction as a reference.

Besides, unlike in Embodiment 1, the second semiconductor inclined part 47b, between the two data lines S1 arrayed and spaced from each other in the x-direction, extends leftward in the range from the right-side data line S1 to a midpoint between the two data lines S1 while being inclined at a predetermined angle to the upper side. For example, it is formed to be inclined at an angle of 10° to the upper side, with the x-direction as a reference.

As shown in FIG. 11, a pixel electrode 62a has trunk parts 62ak and branch parts 62ae, like in Embodiment 1.

As shown in FIG. 11, the trunk parts 62ak of the pixel electrode 62a extend in the x-direction, unlike in Embodiment 1. Here, as shown in FIG. 11, the data lines S1 extending in the y-direction are provided in plurality in the state of being arrayed at intervals in the x-direction, and two trunk parts 62ak are provided between adjacent ones of the plurality of data lines S1 arrayed in the x-direction. Between the two trunk parts 62ak, the branch parts 62ae are provided.

In the pixel electrode 62a, as shown in FIG. 11, the branch parts 62ae are connected to the trunk parts 62ak, and extend in a direction inclined in relation to the x-direction and the y-direction. As shown in FIG. 11, a plurality of the branch parts 62ae are arrayed at intervals in the y-direction, and each of the plurality of branch parts 62ae is connected to the trunk parts 62ak at both its ends in the x-direction.

In this embodiment, as shown in FIG. 11, the branch parts 62ae are each formed in a shape resembling an angle bracket "<" which is symmetrical about an axis extending in the y-direction, between adjacent ones of the plurality of data lines S1 arrayed in the x-direction. Here, the branch parts 62ae are formed along the direction in which the data lines S1 extend.

Specifically, as shown in FIG. 11, each of the branch parts 62ae has a first pixel electrode inclined part 62ae1 and a second pixel electrode inclined part 62ae2.

The first pixel electrode inclined part 62ae1, between the two data lines S1 arrayed and spaced from each other in the x-direction, extends rightward in the range from the left-side data line S1 to a midpoint between the two data lines S1 while being inclined at a predetermined angle to the upper side. For instance, it is formed to be inclined at an angle of 10° to the upper side, with the x-direction as a reference.

Besides, the second pixel electrode inclined part 62ae2, between the two data lines S1 arrayed and spaced from each other in the x-direction, extends leftward in the range from the right-side data line S1 to a midpoint between the two data lines S1 while being inclined at a predetermined angle to the upper side. For example, it is formed to be inclined at an angle of 10° to the upper side, with the x-direction as a reference.

Though not shown in the drawings, the pixel electrode 62a is faced by a common electrode (not shown) via an insulator film (not shown) therebetween, like in Embodiment 1.

As shown in FIG. 11, the data lines S1 extend rectilinearly in a direction along the y-direction, unlike in Embodiment 1. Though not shown in the figure, the data line S1 is electrically connected to a source electrode (not shown) of a pixel switching element so as to supply a data signal, in the same manner as in Embodiment 1.

As shown in FIG. 11, sensor driving wires H1, H2 are each provided in a sensor area RA. The sensor driving wires H1, H2 are each formed by use of a metallic material, and electrically connected to the photosensor element 32. The sensor driving wire H1 on one side is electrically connected to an anode (not shown) of the photosensor element 32. The sensor driving wire H2 on the other side is electrically connected to a cathode (not shown) of the photosensor 32.

In addition, as shown in FIG. 11, the sensor driving wires H1, H2 extend in a direction which is different from the x-direction and the y-direction and which is inclined in relation to the x-direction and the y-direction, like the branch parts 62ae of the pixel electrode 62a. Here, each of the sensor driving wires H1, H2 is formed in a shape resembling an angle bracket "<" which is symmetrical about an axis extending in the y-direction, between adjacent ones of the plurality of data lines S1 arrayed in the x-direction. The sensor driving wires H1, H2 are each formed along the direction in which the branch parts 62ae of the pixel electrode 62a extend.

Specifically, as shown in FIG. 11, the sensor driving wires H1, H2 have first sensor driving wire inclined parts HK1a, HK1b and second sensor driving wire inclined parts HK2a, HK2b, respectively.

Each of the first sensor driving wire inclined parts HK1a, HK1b, between the two data lines S1 arrayed and spaced from each other in the x-direction, extends rightward in the range from the left-side data line S1 to a midpoint between the two data lines S1 while being inclined at a predetermined angle to the upper side. For example, it is formed to be inclined at an angle of 10° to the upper side, with the x-direction as a reference.

Each of the second sensor driving wire inclined parts HK2a, HK2b, between the two data lines S1 arrayed and spaced from each other in the x-direction, extends leftward in the range from the right-side data line S1 to a midpoint between the two data lines S1 while being inclined at a predetermined angle to the upper side. For instance, the second sensor driving wire inclined parts HK2a, HK2b are formed to be inclined at an angle of 10° to the upper side, with the x-direction as a reference.

As shown in FIG. 11, a gate line G1 is formed in a shape resembling an angle bracket "<" which is symmetrical about an axis extending in the y-direction, between adjacent ones of the plurality of data lines S1 arrayed in the x-direction. Here, the gate line G1 is formed along the direction in which the branch parts 62ae of the pixel electrode 62a extend.

Specifically, as shown in FIG. 11, the gate line G1 has a first gate line inclined part GK1 and a second gate line inclined part GK2.

The first gate line inclined part GK1, between the two data lines S1 arrayed and spaced from each other in the x-direction, extends rightward in the range from the left-side data line S1 to a midpoint between the two data lines S1 while being inclined at a predetermined angle to the upper side. For instance, it is formed to be inclined at an angle of 10° to the upper side, with the x-direction as a reference.

Besides, the second gate line inclined part GK2, between the two data lines S1 arrayed and spaced from each other in the x-direction, extends leftward in the range from the right-side data line S1 to a midpoint between the two data lines S1 while being inclined at a predetermined angle to the upper side. For example, it is formed to be inclined at an angle of 10° to the upper side, with the x-direction as a reference.

In addition, though omitted in the figure, the gate line G1 is electrically connected to a gate electrode (not shown) of the pixel switching element so as to supply a scan signal, in the same manner as in Embodiment 1.

The liquid crystal layer 203 has liquid crystal molecules aligned horizontally, like in Embodiment 1. In this embodiment, however, the liquid crystal layer 203 has been subjected to such an aligning treatment that the longitudinal directions of the liquid crystal molecules are set along the x-direction in the xy-plane where the TFT array substrate 201 and the counter substrate 202 face each other.

In this embodiment, as above-mentioned, the first pixel electrode inclined part 62ae1 and the second pixel electrode inclined part 62ae2 constituting each of the branch parts 62ae of the pixel electrode 62a extend in a direction inclined relative to the x-direction and the y-direction in which the plurality of pixels P are arranged in the pixel area PA. Besides, the first semiconductor inclined part 57a and the second semiconductor inclined part 57b constituting the semiconductor layer 47 of the photosensor element 32 extend in a direction inclined relative to the x-direction and the y-direction in which the plurality of pixels P are arranged in the pixel area PA, like the branch parts 62ae. In other words, the photosensor element 32 has a light receiving surface JSa formed in a shape along the direction in which the first pixel electrode inclined parts 62ae1 and the second pixel electrode inclined parts 62ae2 of the pixel electrode 62a extend. Thus, in this embodiment, the light receiving surface JSa of the photosensor element 32 is formed in a shape along the direction in which the first pixel electrode inclined parts 62ae1 and the second pixel electrode inclined parts 62ae2 extend, which makes it possible to enlarge the area of the light receiving surface JSa, in the same manner as in Embodiment 1. Therefore, in this embodiment, the light reception sensitivity of the photosensor elements 32 can be enhanced. Accordingly, in this embodiment, it is possible to realize both displaying of an image with a wide viewing angle and enhancement of the sensitivity of the photosensor element.

<Embodiment 3>

Now, Embodiment 3 of the present invention will be described below.

Figure 12:
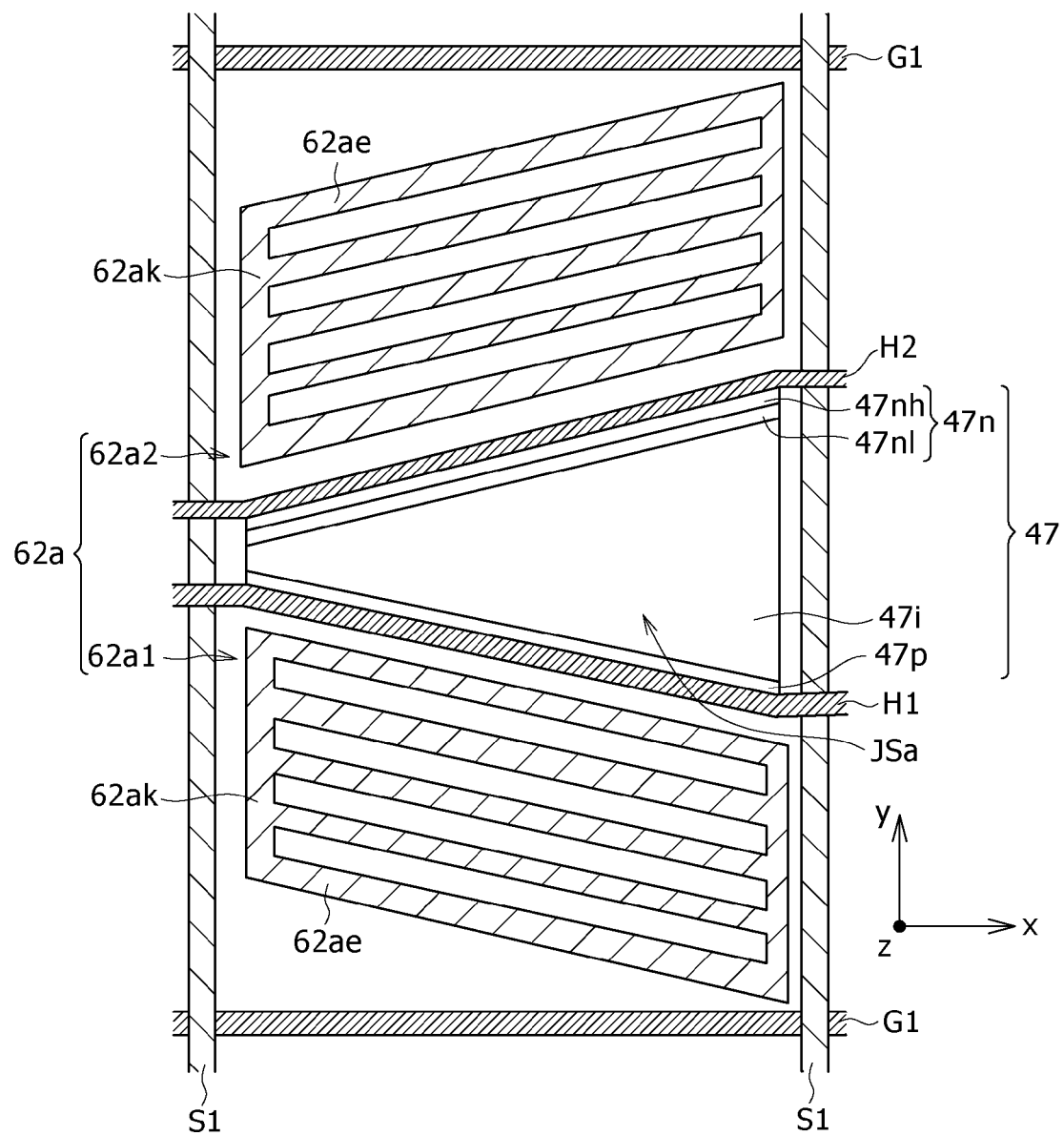
FIG. 12 is a plan view showing schematically a major part of a TFT array substrate in a pixel provided in a pixel area in Embodiment 3 of the invention.

FIG. 12 is a plan view showing schematically a major part of a TFT array substrate 201 in a pixel P provided in a pixel area PA in Embodiment 3 of the present invention. In FIG. 12, two of a plurality of pixels P arrayed in the y-direction are shown. While only one of three sub-pixels constituting one pixel P is representatively shown here, the other sub-pixels have members formed in the same manner as in the sub-pixel shown.

This embodiment is the same as Embodiment 1, except for differences in the shapes of the parts constituting the pixel P. Therefore, descriptions of the same items as in Embodiment 1 will be omitted. For example, in FIG. 12, the pixel switching element is omitted.

The parts in this embodiment will be sequentially described.

In a photosensor element 32, as shown in FIG. 12, a semiconductor layer 47 is so formed as to have a tapered plan-view shape which is symmetrical about an axis extending in the x-direction. Here, the semiconductor layer 47 is formed along a direction in which branch parts 62ae of a pixel electrode 62a and sensor driving wires H1, H2 extend.

Specifically, as shown in FIG. 12, the semiconductor layer 47 is formed to extend between two data lines S1 arrayed and spaced from each other in the x-direction, in such a shape that its width gradually increases in the x-direction from the left data line S1 toward the right data line S1.

Specifically, of the semiconductor layer 47, the upper-side edge extends rightward while being inclined at a predetermined angle to the upper side as one goes from the left data line S1 toward the right data line S1. Besides, of the semiconductor layer 47, the lower-side edge extends rightward while being inclined at a predetermined angle to the lower side as one goes from the left data line S1 toward the right data line S1. For example, the semiconductor layer 47 is so formed as to be demarcated by edges which are inclined at an angle 15° to the upper side and to the lower side, with the x-direction as a reference.

As shown in FIG. 12, two kinds of pixel electrodes 62a are provided, one being a first pixel electrode 62a1 and the other being a second pixel electrode 62a2. The first pixel electrode 62a1 and the second pixel electrode 62a2 are disposed to be arrayed in the y-direction, with the photosensor element 32 interposed therebetween, and are so formed as to be symmetrical with each other about an axis extending in the x-direction.

As shown in FIG. 12, each of the first pixel electrode 62a1 and the second pixel electrode 62a2 has trunk parts 62ak and branch parts 62ae.

As shown in FIG. 12, the trunk parts 62ak extend in the y-direction, unlike in Embodiment 1. Here, as shown in FIG. 12, a plurality of data lines S1 extending in the y-direction are arrayed at intervals in the x-direction, and two trunk parts 62ak are provided between adjacent ones of the plurality of data lines S1 arrayed in the x-direction. In addition, the branch parts 62ae are provided between the two trunk parts 62ak.

As shown in FIG. 12, the branch parts 62ae are connected to the trunk parts 62ak, and extend in a direction which is different from the x-direction and the y-direction and which is inclined relative to the x-direction and the y-direction. As shown in FIG. 12, a plurality of the branch parts 62ae are so disposed as to be arrayed at intervals in the y-direction, and each of them is connected to the trunk parts 62ak at both its ends in the x-direction.

In the first pixel electrode 62a1, as shown in FIG. 12, the branch parts 62ae extend rightward while being inclined at a predetermined angle to the lower side as one goes from the left side toward the right side, between two data lines S1 arrayed and spaced from each other in the x-direction. For example, they are formed to be inclined at an angle of 15° to the lower side, with the x-direction as a reference.

On the other hand, in the second pixel electrode 62a2, as shown in FIG. 12, the branch parts 62ae extend rightward while being inclined at a predetermined angle to the upper side as one goes from the left side toward the right side, between the two data lines S1 arrayed and spaced from each other in the x-direction. For instance, they are formed to be inclined at an angle of 15° to the upper side, with the x-direction as a reference.

Though not shown in the figure, the pixel electrodes 62a are faced by a common electrode (not shown) via an insulator film (not shown) interposed therebetween, in the same manner as in Embodiment 1. In addition, the pixel electrodes 62a, in plurality in the x-direction, are formed to be symmetrical about the data line S1.

As shown in FIG. 12, the data lines S1 extend rectilinearly in a direction along the y-direction, unlike in Embodiment 1. Besides, though not shown in the figure, the data line S1 is electrically connected to a source electrode (not shown) of the pixel switching element so as to supply a data signal, in the same manner as in Embodiment 1.

Sensor driving wires H1, H2 are each electrically connected to the photosensor element 32, like in Embodiment 1. The sensor driving wire H1 on one side is electrically connected to an anode (not shown) of the photosensor element 32. The sensor driving wire H2 on the other side is electrically connected to a cathode (not shown) of the photosensor element 32.

As shown in FIG. 12, each of the sensor driving wires H1, H2 extends in a direction which is different from the x-direction and the y-direction and which is inclined in relation to the x-direction and the y-direction.

Specifically, as shown in FIG. 12, the sensor driving wire H1 on one side extends rightward while being inclined at a predetermined angle to the lower side as one goes from the left side toward the right side, between the two data lines S1 arrayed and spaced from each other in the x-direction. For example, it is formed to be inclined at an angle of 15° to the lower side, with the x-direction as a reference.

As shown in FIG. 12, the sensor driving wire H2 on the other side extends rightward while being inclined at a predetermined angle to the upper side as one goes from the left side toward the right side, between the two data lines S1 arrayed and spaced from each other in the x-direction. For instance, it is formed to be inclined at an angle of 15° to the upper side, with the x-direction as a reference.

As shown in FIG. 12, gate lines G1 are formed to extend in the x-direction, like in Embodiment 1. The gate line G1 is electrically connected to a gate electrode (not shown) of the pixel switching element so as to supply a scan signal, in the same manner as in Embodiment 1.

A liquid crystal layer 203 has liquid crystal molecules aligned horizontally, like in Embodiment 1. In this embodiment, however, the liquid crystal layer 203 has been subjected to an aligning treatment so that the longitudinal directions of the liquid crystal molecules are aligned along the x-direction in the xy-plane where a TFT array substrate 201 and a counter substrate 202 face each other.

In this embodiment, as above-mentioned, the photosensor element 32 has a light receiving surface JSa formed in a shape along the directions in which the branch parts 62ae of the first pixel electrode 62a1 and those of the second pixel electrode 62a2 extend respectively. This makes it possible to enlarge the area of the light receiving surface JSa. Therefore, in this embodiment, the light reception sensitivity of the photosensor element 32 can be enhanced. Accordingly, in this embodiment, it is possible to realize both displaying of an image with a wide viewing angle and enhancement of the sensitivity of the photosensor element.

<Embodiment 4>

Now, Embodiment 4 of the present invention will be described below.

Figure 13:
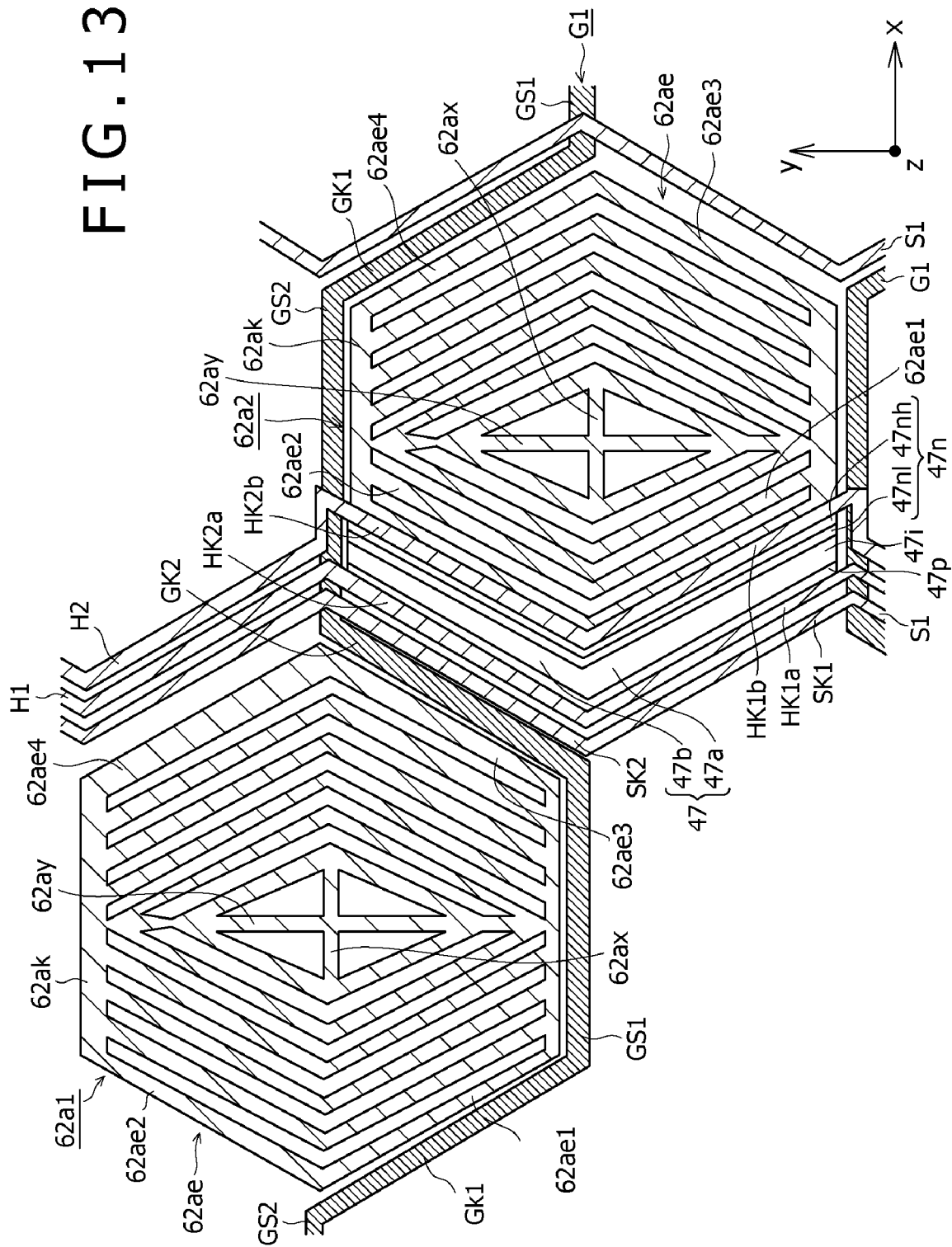
FIG. 13 is a plan view showing schematically a major part of a TFT array substrate in a pixel provided in a pixel area in Embodiment 4 of the invention.

FIG. 13 is a plan view showing schematically a major part of a TFT array substrate in a pixel P provided in a pixel area PA in Embodiment 4 of the present invention. In FIG. 13, two of three sub-pixels constituting one pixel P are shown on a representative basis.

This embodiment is the same as Embodiment 1, except for differences in the shapes of the parts constituting the pixel P as shown in FIG. 13. Therefore, description of the same items as in Embodiment 1 will be omitted. For example, in FIG. 12, a pixel switching element is omitted.

The parts in this embodiment will be sequentially described.

In a photosensitive element 32, as shown in FIG. 13, a semiconductor layer 47 is formed in a plan-view shape resembling an angle bracket "<" which is symmetrical about an axis extending in the x-direction, between adjacent ones of a plurality of data lines S1 arrayed in the x-direction. Each of a p-layer 47P and an n-layer 47n and an i-layer 47i constituting the semiconductor layer 47 is also provided to have a plan-view shape resembling an angle bracket "<" which is symmetrical about an axis extending in the x-direction.

Specifically, as shown in FIG. 13, the semiconductor layer 47 has a first semiconductor inclined part 47a and a second semiconductor inclined part 47b, like in Embodiment 1.

The first semiconductor inclined part 47a, between those parts of two gate lines G1 arrayed and spaced from each other in the y-direction which extend in the x-direction, extends upward in the range from the lower gate line G1 to a midpoint between the two gate lines G1 while being inclined to the left side in relation to the y-direction. For instance, it is formed to be inclined at an angle of 30°, with the y-direction as a reference.

Besides, the second semiconductor inclined part 47b, between those parts of the two gate lines G1 arrayed and spaced from each other in the y-direction which extend in the x-direction, extends downward in the range from the upper gate line G1 to a midpoint between the two gate lines G1 while being inclined to the left side in relation to the y-direction. For example, it is formed to be inclined at an angle of 30°, with the y-direction as a reference.

As shown in FIG. 13, a plurality of the pixel electrodes 62a are disposed so as to form a honeycomb structure.

Here, as shown in FIG. 13, the pixel electrodes 62a are provided in two kinds, one being a first pixel electrode 62a1 and the other being a second pixel electrode 62a2. The first pixel electrode 62a1 and the second pixel electrode 62a2 are disposed to be arrayed, with the photosensor 32 interposed therebetween.

As shown in FIG. 13, the first pixel electrode 62a1 is formed to be regular-hexagonal in outer shape. The first pixel electrode 62a1 is provided, for example, so as to correspond to two of the three sub-pixels constituting one pixel P.

Besides, as shown in FIG. 13, the second pixel electrode 62a2 has a configuration in which the semiconductor layer 47 of the photosensor element 32 is provided in its portion corresponding to a left-side portion of the first pixel electrode 62a1, and has a hexagonal shape obtained as if this portion were removed from the first pixel electrode 62a1. The second pixel electrode 62a2 is provided, for example, so as to correspond to one of the three sub-pixels constituting one pixel P.

Besides, each of the pixel electrodes 62a is so disposed that the edges of the hexagonal outer shape thereof are respectively parallel to the edges of the hexagonal outer shapes of the six other pixel electrodes 62a adjacent thereto.

As shown in FIG. 13, each of the first pixel electrode 62a1 and the second pixel electrode 62a2 constituting the pixel electrodes 62a has trunk parts 62ak and branch parts 62ae.

As shown in FIG. 13, the trunk parts 62ak extend in the x-direction. Here, as shown in FIG. 13, the trunk parts 62ak are provided respectively in an upper end area and a lower end area. In addition, the branch parts 62ae are provided between the two trunk parts 62ak. Besides, in a central portion between the two trunk parts 62ak, a first extension part 62ax extending in the x-direction and a second extension part 62ay extending in the y-direction are formed. Further, the first extension part 62ax and the second extension part 62ay intersect each other in the central area between the trunk parts 62ak.

As shown in FIG. 13, the branch parts 62ae are connected to the trunk parts 62ak, and extend in a direction which is different from the x-direction and the y-direction and which is inclined relative to the x-direction and the y-direction. As shown in FIG. 13, a plurality of the branch parts 62ae are so arranged as to be spaced from one another in the y-direction, and each of them is connected to the trunk parts 62ak at both its ends in the y-direction.

In this embodiment, as shown in FIG. 13, each of the branch parts 62ae is formed in a shape resembling an angle bracket "<" which is symmetrical about an axis extending in the x-direction, between adjacent ones of a plurality of gate lines G1 arrayed in the y-direction. Here, the branch parts 62ae are formed along the direction in which the data lines S1 extend. Further, in the first pixel electrode 62a1, the branch parts 62ae are formed to be symmetrical about an axis extending in the y-direction.

Specifically, as shown in FIG. 13, the branch parts 62ae include first pixel electrode inclined parts 62ae1, second pixel electrode inclined parts 62ae2, third pixel electrode inclined parts 62ae3, and fourth pixel electrode inclined parts 62ae4.

Each of the first pixel electrode inclined parts 62ae1, between those parts of the two gate lines G1 arrayed and spaced from each other in the y-direction which extend in the x-direction, extends upward in the range from the lower-side gate line G1 to a midpoint between the two gate lines G1 while being inclined to the left side in relation to the y-direction. For instance, it is formed to be inclined at an angle of 30°, with the y-direction as a reference.

In the first pixel electrode 62a1, as shown in FIG. 13, five first pixel electrode inclined parts 62ae1 are formed to be arrayed at intervals in the x-direction. On the other hand, in the second pixel electrode 62a2, three first pixel electrode inclined parts 62ae1 are formed to be arrayed at intervals in the x-direction, as shown in FIG. 13.

Besides, each of the second pixel electrode inclined parts 62ae2, between those parts of the two gate lines G1 arrayed and spaced from each other in the y-direction which extend in the x-direction, extends downward in the range from the upper-side gate line G1 to a midpoint between the two gate lines G1 while being inclined to the left side in relation to the y-direction. For example, it is formed to be inclined at an angle of 30°, with the y-direction as a reference.

In the first pixel electrode 62a1, as shown in FIG. 13, five second pixel electrode inclined parts 62ae2 are formed to be arrayed at intervals in the x-direction. On the other hand, in the second pixel electrode 62a2, three second pixel electrode inclined parts 62ae2 are formed to be arrayed at intervals in the x-direction, as shown in FIG. 13. Thus, the second pixel electrode inclined parts 62ae2 are formed to be symmetrical with the first pixel electrode inclined parts 62ae1 about an axis extending in the x-direction.

In addition, each of the third pixel electrode inclined parts 62ae3, between those parts of the two gate lines G1 arrayed and spaced from each other in the y-direction which extend in the x-direction, extends upward in the range from the lower gate line G1 to a midpoint between the two gate lines G1 while being inclined to the right side in relation to the y-direction. For instance, it is formed to be inclined at an angle of 30°, with the y-direction as a reference.

In the first pixel electrode 62a1, as shown in FIG. 13, five third pixel electrode inclined parts 62ae3 are formed to be arrayed at intervals in the x-direction. Specifically, in the first pixel electrode 62a1, the third pixel electrode inclined parts 62ae3 are formed to be symmetrical with the first pixel electrode inclined parts 62ae1 about an axis extending in the y-direction. Similarly, also in the second pixel electrode 62a2, five third pixel electrode inclined parts 62ae3 are formed to be arrayed at intervals in the x-direction, as shown in FIG. 13.

Further, each of the fourth pixel electrode inclined parts 62ae4, between those parts of the two gate lines G1 arrayed and spaced from each other in the y-direction which extend in the x-direction, extends downward in the range from the upper gate line G1 to a midpoint between the two gate lines G1 while being inclined to the right side in relation to the y-direction. For example, it is formed to be inclined at an angle of 30°, with the y-direction as a reference.

In the first pixel electrode 62a1, as shown in FIG. 13, five fourth pixel electrode inclined parts 62ae4 are formed to be arrayed at intervals in the x-direction. Specifically, in the first pixel electrode 62a1, the fourth pixel electrode inclined parts 62ae4 are formed to be symmetrical with the second pixel electrode inclined parts 62ae2 about an axis extending in the y-direction. In addition, in the first pixel electrode 62a1, the fourth pixel electrode inclined parts 62ae4 are formed to be symmetrical with the third pixel electrode inclined parts 62ae3 about an axis extending in the x-direction. Similarly, also in the second pixel electrode 62a2, five fourth pixel electrode inclined parts 62ae4 are formed to be arrayed at intervals in the x-direction, as shown in FIG. 13. Specifically, in the second pixel electrode 62a2, the fourth pixel electrode inclined parts 62ae4 are formed to be symmetrical with the third pixel electrode inclined parts 62ae3 about an axis extending in the x-direction.

Besides, though not shown in the figure, the pixel electrodes 62a are so provided as to be faced by a common electrode (not shown) via an insulator film (not shown) interposed therebetween, like in Embodiment 1.

As shown in FIG. 13, the data lines S1 are formed in a shape resembling an angle bracket "<" which is symmetrical about an axis extending in the x-direction, between adjacent ones of the plurality of gate lines G1 arrayed in the y-direction. Here, the data lines S1 are formed along the direction in which the branch parts 62ae of the pixel electrode 62a extend.

Specifically, as shown in FIG. 13, the data line S1 has a first data line inclined part SK1 and a second data line inclined part SK2.

The first data line inclined part SK1, between those parts of the two gate lines G1 arrayed and spaced from each other in the y-direction which extend in the x-direction, extends upward in the range from the lower-side gate line G1 to a midpoint between the two gate lines G1 while being inclined to the left side. For example, it is formed to be inclined at an angle of 30°, with the y-direction as a reference.

Besides, the second data line inclined part SK2, between those parts of the two gate lines G1 arrayed and spaced from each other in the y-direction which extend in the x-direction, extends downward in the range from the upper-side gate line S1 to a midpoint between the two gate lines G1 while being inclined to the left side. For instance, it is formed to be inclined at an angle of 30°, with the y-direction as a reference.

In addition, though omitted in the figure, each of the gate lines G1 is electrically connected to a gate electrode (not shown) of a pixel switching element so as to supply a scan signal, in the same manner as in Embodiment 1.

Sensor driving wires H1, H2 are each electrically connected to the photosensor element 32. The sensor driving wire H1 on one side is electrically connected to an anode (not shown) of the photosensor element 32. The sensor driving wire H2 on the other side is electrically connected to a cathode (not shown) of the photosensor element 32.

As shown in FIG. 13, the sensor driving wires H1, H2 extend in a direction which is different from the x-direction and the y-direction and which is inclined in relation to the x-direction and the y-direction, like the branch parts 62ae of the pixel electrodes 62a. Here, each of the sensor driving wires H1, H2 is formed in a shape resembling an angle bracket "<" which is symmetrical about an axis extending in the y-direction, between adjacent ones of the plurality of data lines S1 arrayed in the x-direction. The sensor driving wires H1, H1 are each formed along the direction in which the branch parts 62ae of the pixel electrodes 62a extend.

Specifically, as shown in FIG. 13, the sensor driving wires H1, H2 have first sensor driving wire inclined parts HK1a, HK1b and second sensor driving wire inclined parts HK2a, HK2b, respectively.

Each of the first sensor driving wire inclined parts HK1a, HK1b, between those parts of the two gate lines G1 arrayed and spaced from each other in the y-direction which extend in the x-direction, extends upward in the range from the lower gate line G1 to a midpoint between the two gate lines G1 while being inclined to the left side. For instance, it is formed to be inclined at an angle of 30°, with the y-direction as a reference.

Besides, each of the second sensor driving wire inclined parts HK2a, HK2b, between those parts of the two gate lines G1 arrayed and spaced from each other in the y-direction which extend in the x-direction, extends downward in the range from the upper gate line G1 to a midpoint between the two gate lines G1 while being inclined to the left side. For example, it is formed to be inclined at an angle of 30°, with the y-direction as a reference.

As shown in FIG. 13, the gate lines G1 are formed along edges of the outer shapes of the pixel electrodes 62a.

Specifically, as shown in FIG. 13, the gate line G1 has a first horizontally extending part GS1, a second horizontally extending part GS2, a first gate line inclined part GK1, and a second gate line inclined part GK2.

As shown in FIG. 13, the first horizontally extending part GS1 extends rectilinearly along an edge extending in the x-direction at a lower portion of the pixel electrode 62a having the hexagonal outer shape. Here, the first horizontally extending part GS1 is formed along the lower edge of the first pixel electrode 62a1.

As shown in FIG. 13, the second horizontally extending part GS2 extends rectilinearly along an edge extending in the x-direction at an upper portion of the pixel electrode 62a having the hexagonal outer shape. Here, the second horizontally extending part GS2 is formed along the upper edge of the second pixel electrode 62a2. The second horizontally extending part GS2 is so provided as to be arrayed and spaced from the first horizontal extending part GS1 in the y-direction.

As shown in FIG. 13, the first gate line inclined part GK1 is provided between the first horizontally extending part GS1 and the second horizontally extending part GS2 which are arrayed and spaced from each other in the y-direction. The first gate line inclined part GK1 extends rectilinearly so as to connect a one-side end of the first horizontally extending part GS1 in the x-direction with an other-side end of the second horizontally extending part GS2 in the x-direction. Here, it extends upward from the one-side end of the first horizontally extending part GS1 to the other-side end of the second horizontally extending part GS2 while being inclined to the left side, with the y-direction as a reference. For example, it is formed to be inclined at an angle of 30°, with the y-direction as a reference.

As shown in FIG. 13, the second gate line inclined part GK2 is provided between the first horizontally extending part GS1 and the second horizontally extending part GS2 which are arrayed and spaced from each other in the y-direction. The second gate line inclined part GK2 extends rectilinearly so as to connect the other-side end of the first horizontally extending part GS1 in the x-direction with the one-side end of the second horizontally extending part GS2 in the x-direction. Here, it extends upward from the other-side end of the first horizontally extending part GS1 to the one-side end of the second horizontally extending part GS2 while being inclined to the right side, with the y-direction as a reference. For instance, it is formed to be inclined at an angle of 30°, with the y-direction as a reference.

Besides, though omitted in the figure, the gate line G1 is electrically connected to a gate electrode (not shown) of a pixel switching element so as to supply a scan signal, in the same manner as in Embodiment 1.

A liquid crystal layer 203 has liquid crystal molecules aligned horizontally, like in Embodiment 1. Specifically, in this embodiment, the liquid crystal layer 203 has been subjected to an aligning treatment so that the longitudinal directions of the liquid crystal molecules are aligned in the y-direction in the xy-plane where a TFT array substrate 201 and a counter substrate 202 face each other.

As above-mentioned, in this embodiment, the photosensor element 32 has a light receiving surface JSa formed in a shape along the direction in which the branch parts 62ae of the pixel electrodes 62a extend. This makes it possible to enlarge the area of the light receiving surface JSa. Therefore, in this embodiment, the light reception sensitivity of the photosensor elements 32 can be enhanced. Accordingly, it is possible to realize both displaying of an image with a wide viewing angle and enhancement of the sensitivity of the photosensor elements 32.

Modes for carrying out the present invention are not limited to the above-described embodiments, and various modifications can be adopted.

In addition, for example, while the embodiments of the present invention have been described with reference to the case where the pixel switching element 31 is configured as a bottom gate thin film transistor, this configuration is not limitative of the invention. For example, a top gate TFT can be formed as the pixel switching element 31. Other than these, the pixel switching element 31 may be formed to have a dual gate structure.

Besides, while the embodiments have been described referring to the case where a plurality of photosensor elements 32 are provided so as to correspond respectively to a plurality of pixels P, this configuration is not limitative. For instance, one photosensor element 32 may be provided correspondingly to a plurality of pixels P; on the contrary, a plurality of photosensors 32 may be provided correspondingly to one pixel P.

Furthermore, the liquid crystal panel 203 is applicable to liquid crystal panels of various systems such as the IPS (In-Pane Switching) system, in addition to the above-described displaying mode.

Further, while the embodiments have been described with reference to the case where a PIN type photodiode is provided as the photosensor element 32, this configuration is not limitative. For example, a photodiode in which the i-layer is doped with an impurity may be formed as the photosensor element 32, whereby substantially the same effects as above-mentioned can be obtained.

In addition, while the embodiments have been described referring to the case where the illuminating light is emitted in such a manner as to contain infrared rays as the invisible rays, this configuration is not limitative. For instance, illuminating light may be so emitted as to contain ultraviolet rays as the invisible rays.

Besides, the liquid crystal display 100 according to an embodiment of the present invention is applicable as a component part in various electronic apparatuses.

FIGS. 14 to 18 illustrate electronic apparatuses to which a liquid crystal display according to an embodiment of the present invention has been applied.

Figure 14:
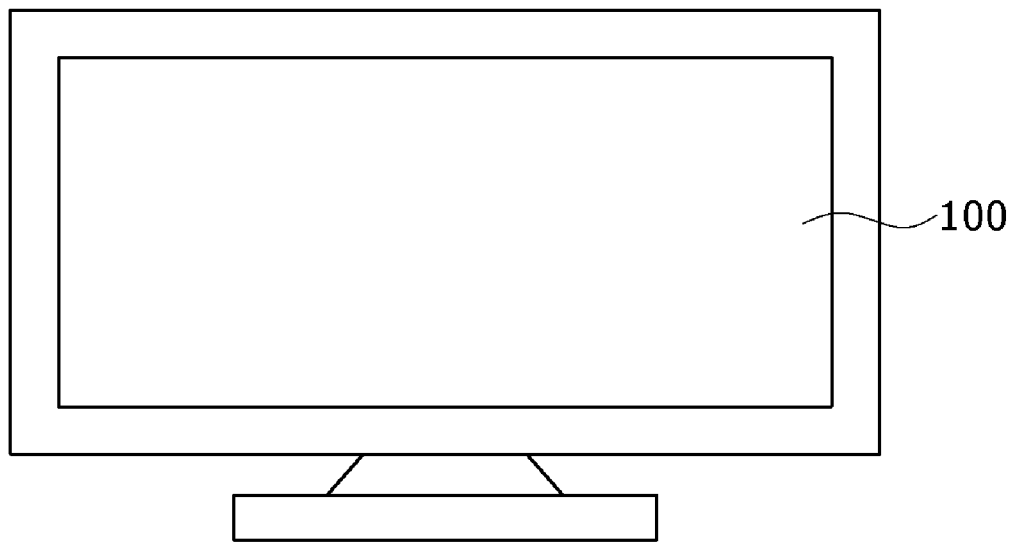
FIG. 14 illustrates an electronic apparatus to which a liquid crystal display according to an embodiment of the invention has been applied.

As shown in FIG. 14, in a television set for receiving and displaying television broadcasts, the liquid crystal display 100 is applicable as a display device which displays the received images on a display screen and through which operator commands are inputted.

Figure 15:
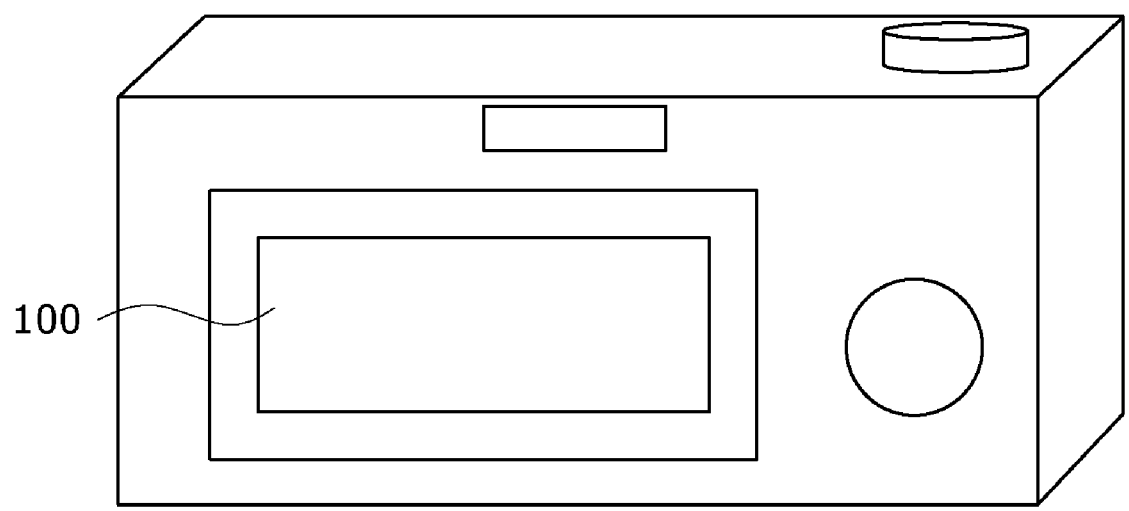
FIG. 15 illustrates an electronic apparatus to which a liquid crystal display according to an embodiment of the invention has been applied.

In addition, as shown in FIG. 15, in a digital still camera, the liquid crystal display 100 is applicable as a display device which displays images such as shot images on a display screen and through which operator commands are inputted.

Figure 16:
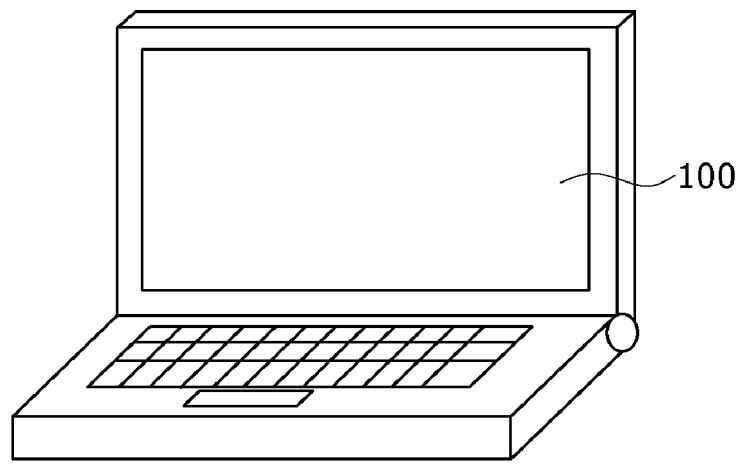
FIG. 16 illustrates an electronic apparatus to which a liquid crystal display according to an embodiment of the invention has been applied.

Besides, as shown in FIG. 16, in a notebook type personal computer, the liquid crystal display 100 is applicable as a display device which displays operational graphics and the like on a display screen and through which operator commands are inputted.

Figure 17:
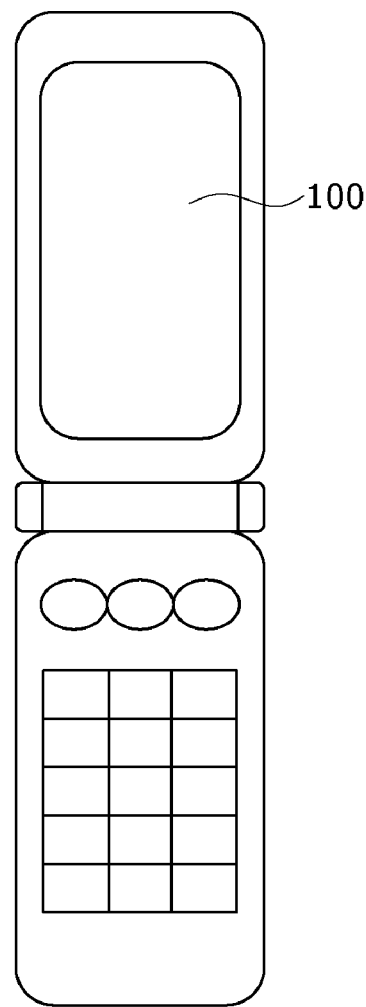
FIG. 17 illustrates an electronic apparatus to which a liquid crystal display according to an embodiment of the invention has been applied.

In addition, as shown in FIG. 17, in a mobile phone, the liquid crystal display 100 is applicable as a display device which displays operational graphics and the like on a display screen and through which operator commands are inputted.

Figure 18:
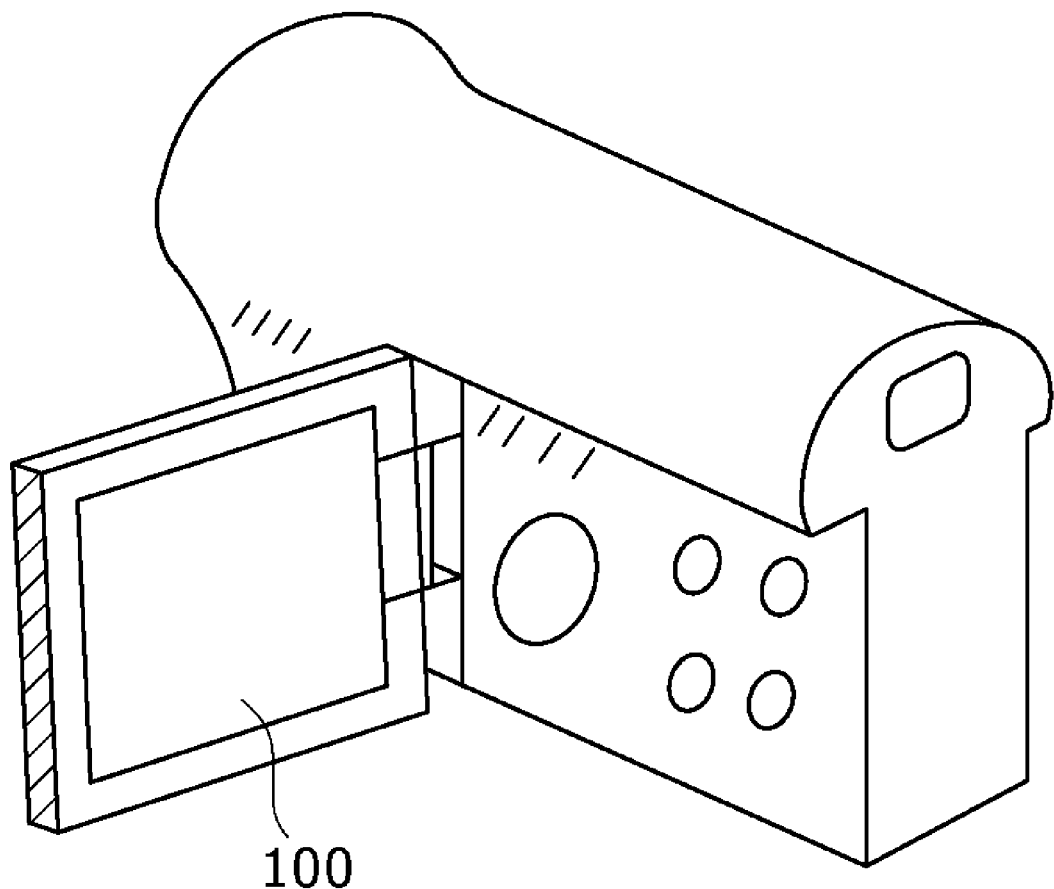
FIG. 18 illustrates an electronic apparatus to which a liquid crystal display according to an embodiment of the invention has been applied.

Besides, as shown in FIG. 18, in a video camera, the liquid crystal display 100 is applicable as a display device which displays operational graphics and the like on a display screen and through which operator commands are inputted.

Incidentally, the photosensor element 32 in the embodiments described above corresponds to the photosensor element in the present invention. Similarly, the pixel electrode 62a in the embodiments corresponds to the pixel electrode in the invention; the branch part 62ae in the embodiments correspond to the inclined part of the pixel electrode in the invention; the trunk part 62ak in the embodiments corresponds to the trunk part in the invention; the common electrode 62b in the embodiments corresponds to the common electrode in the invention; the liquid crystal display 100 in the embodiments corresponds to the liquid crystal display in the invention; the liquid crystal panel 200 in the embodiments corresponds to the liquid crystal panel in the invention; the TFT array substrate 201 in the embodiments corresponds to the first substrate in the invention; the counter substrate 202 in the embodiments corresponds to the second substrate in the invention; the liquid crystal layer 203 in the embodiments corresponds to the liquid crystal layer in the invention; the backlight 300 in the embodiments corresponds to the illuminating unit in the invention; the position detecting section 402 in the embodiments corresponds to the position detecting section in the invention; the gate lines G1 in the embodiments correspond to the first and second wires in the invention; the gate line inclined parts GK1, GK2 in the embodiments correspond to the wire inclined parts in the invention; the sensor driving wires H1, H2 in the embodiments correspond to the sensor driving wire in the invention; the sensor driving wire inclined parts HK1a, HK2a in the embodiments correspond to the sensor driving wire inclined part in the invention; the light receiving surface JSa in the embodiments corresponds to the light receiving surface in the invention; the pixel P in the embodiments corresponds to the pixel in the invention; the pixel area PA in the embodiments corresponds to the pixel area in the invention; the data lines S1 in the embodiments correspond to the first and second wires in the invention; and the first data line inclined parts SK1, in the embodiments correspond to the wire inclined part in the invention.

The present application contains subject matter related to that disclosed in Japanese Priority Patent Application JP 2008-122453 filed in the Japan Patent Office on May 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising a liquid crystal panel including:
   a first substrate:
   a second substrate opposed to said first substrate: and
   a liquid crystal layer interposed between said first substrate and said second substrate,
   wherein,
   (a) a plurality of pixels are arrayed in a first direction and in a second direction orthogonal to said first direction in a pixel area provided in a plane where said first substrate and said second substrate are opposed,
   (b) said first substrate includes
      (i) a plurality of pixel electrodes, each of which corresponds to a respective pixel, and
      (ii) photosensor elements each operable to generate light reception data by receiving, at a light receiving surface, incident light incident on the first substrate side from the second substrate side via said liquid crystal layer,
   (c) said pixel electrodes and said photosensor elements are provided at a surface opposed to said second substrate in said pixel area,
   (d) each of said pixel electrodes includes an inclined part extending in a direction inclined relative to said first direction and said second direction in said pixel area, and
   (e) said photosensor elements are each formed with said light receiving surface in a shape extending along said direction in which said pixel electrodes extend so that said photosensor element parallels said pixel electrode inclined parts.

2. The liquid crystal display according to claim 1, wherein:
   each of said pixel electrodes each has a trunk part extending in said first direction, and
   each of said pixel electrodes has a plurality of said inclined parts spaced from one another in said first direction, said plurality of inclined parts being connected to said trunk part.

3. The liquid crystal display according to claim 2, wherein:
said first substrate has a common electrode formed in said pixel area, and
said pixel electrodes and said common electrode are configured to apply in-pane fields to said liquid crystal layer.

4. The liquid crystal display according to claim 3, wherein:
said liquid crystal panel has
  (a) a plurality of first wires provided to be spaced from one another in said first direction so as to demarcate a plurality of pixels arrayed in said first direction in said pixel area, and
  (b) a plurality of second wires provided to be spaced from one another in said second direction so as to demarcate a plurality of pixels arrayed in said second direction in said pixel area;
each of said first wires each has a wire inclined part extending in a direction which is different from said first and second directions and is inclined relative to said second direction in said pixel area; and
said inclined part of each of said pixel electrodes is formed along the direction in which said wire inclined part of said first wire extends.

5. The liquid crystal display according to claim 4, wherein:
said liquid crystal panel has sensor driving wires connected to said photosensor elements;
each of said sensor driving wires each includes a sensor driving wire inclined part extending in a direction which is different from said first and second directions and is inclined relative to said second direction in said pixel area; and
said inclined part of each of said pixel electrodes is formed along the direction in which said sensor driving wire inclined parts extend.

6. The liquid crystal display according to claim 1, further comprising a position detecting section operable to detect the position of an object to be detected which is moved to a surface on the second substrate side of said liquid crystal panel,
wherein,
  a plurality of said photosensor elements are disposed in said pixel area, and
  said position detecting section detects the position of said object to be detected, based on light reception data generated by said plurality of photosensor elements.

7. The liquid crystal display according to claim 6, further comprising an illuminating unit operable to emit illuminating light to that surface of said liquid crystal panel which is on the first substrate side,
wherein,
  said liquid crystal panel is so configured that said illuminating light emitted by said illuminating unit is transmitted therethrough from its surface on the first substrate side to its surface on the second substrate side and that an image is displayed in said pixel area by said transmitted light, and
  said photosensor elements are each operable to receive, at said light receiving surface thereof, the reflected light generated upon reflection on said object to be detected of said illuminating light having been emitted by said illuminating unit and been transmitted through said liquid crystal panel.

8. The liquid crystal display according to claim 7, wherein said illuminating unit is configured to emit visible rays and invisible rays as said illuminating light.

9. The liquid crystal display according to claim 8, wherein said illuminating unit emits infrared rays as said invisible rays.

* * * * *